(12) United States Patent
Shinners et al.

(10) Patent No.: US 6,616,527 B2
(45) Date of Patent: Sep. 9, 2003

(54) YIELD MONITOR FOR FORAGE CROPS IN FORAGE MACHINERY INCLUDING AN IMPELLER

(75) Inventors: Kevin J. Shinners, Madison, WI (US); Neil G. Barnett, Winnipeg (CA); Walter M. Schlesser, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/208,692

(22) Filed: Jul. 29, 2002

(65) Prior Publication Data

US 2002/0187819 A1 Dec. 12, 2002

Related U.S. Application Data

(62) Division of application No. 09/606,221, filed on Jun. 29, 2000, now Pat. No. 6,431,981.
(60) Provisional application No. 60/141,799, filed on Jun. 30, 1999.

(51) Int. Cl.[7] .................................................. A01F 12/00
(52) U.S. Cl. ........................................ 460/6; 56/10.2 R
(58) Field of Search ........................ 56/10.2 G, 10.2 H, 56/10.2 R, 10.2 C, DIG. 15; 73/861.73, 12.06, 12.09, 12.11, 12.13, 12.14; 460/1, 6, 149

(56) References Cited

U.S. PATENT DOCUMENTS 4,440,029 A * 4/1984 Tomiyasu et al. ........ 73/861.73
4,487,002 A * 12/1984 Kruse et al. ................... 460/6

(List continued on next page.)

FOREIGN PATENT DOCUMENTS

| DE | 40 41 995 | | 7/1992 |
| EP | 0 090 534 | | 10/1983 |
| EP | 0 122 343 | | 10/1984 |
| EP | 0 339 141 | | 11/1989 |
| EP | 0 774 383 | | 5/1997 |
| EP | 0 775 612 | | 5/1997 |
| EP | 0 887 008 | | 12/1998 |
| EP | 0 914 765 | | 5/1999 |
| EP | 0 958 729 | | 11/1999 |
| EP | 0 960 557 | | 12/1999 |
| GB | 1 536 522 | | 12/1978 |
| GB | 2 002 903 | | 2/1979 |
| GB | 2002903 A | * | 2/1979 |
| GB | 2 303 039 | | 2/1997 |
| WO | WO 90/12492 | | 11/1990 |
| WO | WO 00/10377 | * | 3/2000 |

OTHER PUBLICATIONS

Hains, W. H., et al. (1984), "Feedroll Displacement on a Forage Harvester as a Measurment of the Throughput of Harvested Crops", pp. 52–59 Agricultural Electronics—1983 and Beyong—vol. 1.

(List continued on next page.)

*Primary Examiner*—Robert E. Pezzuto
*Assistant Examiner*—Nathan Mammen
(74) *Attorney, Agent, or Firm*—Duft Setter Ollila & Bornsen LLC

(57) ABSTRACT

Yield monitor apparatus and methods for a forage processing machinery are provided. The yield monitor measures a forage yield by variously measuring a forage impingement force, a forage volume flow, a forage volume increment accumulation, or a forage processing machinery drive load. The yield measures an impeller speed. The yield monitor may generate a yield amount, with the yield amount capable of being stored and displayed to a forage processing machinery operator. Alternatively, the yield monitor may generate a groundspeed control signal that is used by the forage processing machinery to control a forage processing machinery groundspeed or other forage processing machinery parameters.

7 Claims, 12 Drawing Sheets

U.S. PATENT DOCUMENTS

| | | | |
|---|---|---|---|
| 4,527,241 A | | 7/1985 | Sheehan et al. |
| 5,282,389 A | * | 2/1994 | Faivre et al. ............ 73/861.73 |
| 5,318,475 A | | 6/1994 | Schrock et al. |
| 5,335,554 A | * | 8/1994 | Kempf et al. ............ 73/861.73 |
| 5,779,541 A | * | 7/1998 | Helfrich ......................... 460/6 |
| 5,795,221 A | * | 8/1998 | Diekhans ....................... 460/6 |
| 5,837,906 A | * | 11/1998 | Palmer .................... 73/861.73 |
| 5,913,801 A | | 6/1999 | Bottinger et al. |
| 5,959,218 A | * | 9/1999 | Strubbe ................... 73/861.73 |
| 6,003,387 A | * | 12/1999 | Larson et al. ............ 73/861.73 |
| 6,014,903 A | * | 1/2000 | Strubbe et al. .......... 73/861.73 |
| 6,138,518 A | * | 10/2000 | Strubbe ................... 73/861.73 |
| 6,272,818 B1 | | 8/2001 | Sebben et al. |
| 6,272,819 B1 | * | 8/2001 | Wendte et al. ........... 56/10.2 E |
| 6,401,549 B1 | * | 6/2002 | Ohlemeyer .............. 73/861.73 |
| 6,460,008 B1 | * | 10/2002 | Hardt ............................ 460/1 |

OTHER PUBLICATIONS

Auernhammer, H., et al., "Yield Measurement on Self Propelled Forage Harvesters", 1995 Annual ASAE International Meeting, Chicago, IL, Jun. 19–23, 1995.

Behme, Jeffrey A., et al., "Site–Specific Yield for Forages", 1997 ASAE Annual International Meeting, Minneapolis, MN, Aug. 10–14, 1997.

Campbell, Ronald H., et al., "Monitoring Methods for Potato Yield Mapping", 1994 ASAE International Winter Meeting, Atlanta, GA, Dec. 13–16, 1994.

Chevako, Robert J., "Real–Time Measurement and Control of Bale Weight in Kicker Balers", Agric. Electronics—1983 & Beyond, pp. 38–45.

Durrence, J.S., et al., "Evaluation of Commercially–Available Cotton Yield Monitors in Georgia Field Conditions", 1998 ASAE International Meeting, Orlando, FL, Jul. 12–15, 1998.

Godwin, R. J., et al., "Yield Mapping by Mass Accumulation Rate", 1997 ASAE Annual International Meeting, Minneapolis, MN, Aug. 10–14, 1997.

Henson, W. H., JR., et al., "Electrical Measurement of the Moisture Content of Baled Alfalfa Hay", 1987 Summer Meeting of the ASAE, Baltimore, MD, Jun. 28–Jul. 1, 1987.

Kettle, L. Y., et al., "An Evaluation of Yield Monitors and GPS Systems on Hillside Combines Operating on Steep Slopes in the Palouse", 1998 ASAE Annual International Meeting, Orlando, FL, Jul. 12–16, 1998.

Kormann, G., et al., "Testing Stand for Yield Measurement Systems in Combine Harvesters", 1998 ASAE Annual International Meeting, Orlando, FL, Jul. 12–16, 1998.

Pang, S. N., et al., "A Gain Flow Sensor for Yield Mapping", 1990 ASAE International Winter Meeting, Chicago, IL, Dec. 18–21, 1990.

Perry, Calvin D., et al., "Field Experiences with a Prototype Peanut Yield Monitor", 1998 ASAE Annual International Meeting, Orlando, FL, Jul. 12–16, 1998.

PFeiffer, Dohn W., et al., "Real–Time Corn Yield Sensor", 1993 ASAE International Summer Meeting, Spokane, WA, Jun. 20–23, 1993.

Sanaei, A., et al., "Yield Measurement Reliability on Combine Harvesters", 1996 ASAE Annual International Meeting, Phoenix, AZ, Jul. 16, 1996.

Thomas, D. L., et al., "Development and Implementation of a Load Cell Yield Monitor for Peanut", 1997 ASAE Annual International Meeting, Minneapolis, MN, Aug. 10–14, 1997.

Van Der Werf, H.M.G., et al., (1994), "Estimation of Yield of Silage Maize Dry Matter from Volume Harvested or by Sampling Harvested Trailer Loads", J. Agric. Engng. Res. 57:207–212.

Vanischen, R., et al, "A Measurement Technique for Yield Mapping of Corn Silage", International Conference on Agricultural Engineering, Berlin, Germany, Oct. 24–26, 1990.

Wagner, L. E., et al., "Gain Flow Measurement with a Pivoted Auger", Am. Soc. Ag. Engineers 30(6):1583–1586.

Walter, Jason D., et al. Sugarbeet Yield Monitoring for Site–Specific Farming:, 1996 ASAE International Summer Meeting, Phoenix, AZ, Jul. 14–18, 1996.

Wild, K., et al., "Automatic Data Acquistion on Round Balers", 1994 ASAE International Winter Meeting, Atlanta, GA, Dec. 13–16, 1994.

Wild, K., et al., "Dynamic Weighing in a Round Baler for Local Yield Measurement", 1997 ASAE Annual International Meeting, Minneapolis, MN, Aug. 10–14, 1997.

* cited by examiner

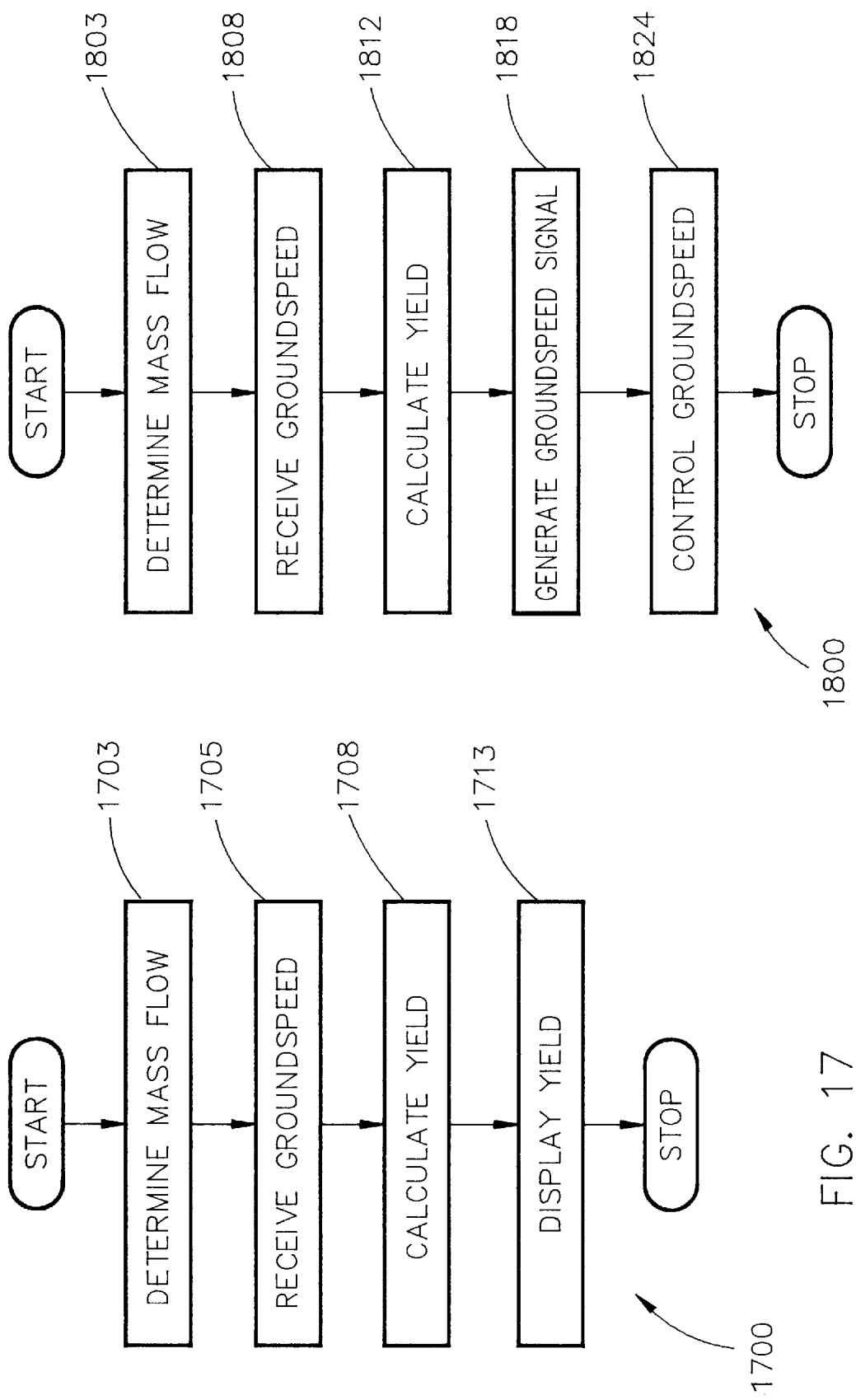

YIELD MONITOR FOR FORAGE CROPS IN FORAGE MACHINERY INCLUDING AN IMPELLER

CROSS-REFERENCE TO RELATED APPLICATION

This application is a divisional application of U.S. patent application filed Jun. 29, 2000, having Ser. No. 09/606,221 now U.S. Pat. No. 6,431,981, that claims priority to U.S. Provisional Application Ser. No. 60/141,799, filed Jun. 30, 1999.

STATEMENT REGARDING FEDERALLY SPONSORED RESEARCH OR DEVELOPMENT

This invention was made with United States government support awarded by the following agencies: USDA 98-CRHF-0-6055. The United States has certain rights in this invention.

BACKGROUND OF THE INVENTION

1. Field of the Invention

The present invention relates generally to a yield monitor, and more particularly to a yield monitor for use with forage processing machinery.

2. Description of the Background Art

Modern farming has continued to evolve and change as farmers strive to increase efficiency of farming methods and to operate in a way that maximizes yields while conserving soil and minimizing use of pesticides, fertilizers, etc. One area of great interest is precision farming, where instead of treating a field as one uniform unit of land, a farmer maps, analyzes, fertilizes, harvests, and otherwise treats small sections of a field. Using precision farming techniques, a farmer can more precisely control the application of fertilizers, pesticides, etc., and can more precisely monitor resulting yields. This allows field treatment on more of an as-needed basis and makes better use of resources.

In order to do this, a farmer needs to be able to measure and record yield levels at different spots in the field as the crop is being harvested or otherwise processed. This data may be used to generate a yield map showing yield levels for each region of a field.

In the prior art, precision farming for grain production has included devices such as yield monitors. Typically, yield monitors are included on a combine or other grain harvester and can gather yield data as the grain is harvested. For example, in a wheat combine, the grain is weighed or otherwise quantified as it is harvested (i.e., weighed in the harvesting machine). As previously discussed, this presents advantages to the farmer in being able to know how each small region of the field is producing. Problem regions can be targeted, insect infestations can be outlined, different soil types can be identified and plotted, diseases can be identified, fertilizer quantities can be adjusted, etc.

Typically, when storing yield data to a yield map, multiple measurements may be taken and averaged for each cell (a field may be divided up into cells, with a cell being the smallest unit measured or displayed). Typically, a cell is equal in width to a harvester or processing machinery operating width, such as, for example, a cut width or pickup width. By measuring an instantaneous yield amount, a machine can measure and record a yield amount for each cell of a field. The data may be manipulated or transmitted to other computers for analysis and storage.

One area that has not seen wide application of precision farming methods and machinery is in the area of forage. Forage is defined as cultivated non-grain plants or plant parts, other than separated grain, grown for grazing or for harvest as animal feed. The term forage generally refers to more-digestible material (e.g., what is called pasturage, hay, silage, dehydrated, green chop) in contrast to less-digestible plant material, known as roughage. Examples of forage crops are grasses, hay, alfalfa, corn silage, etc. Forage is widely used for animal feed especially, for example, during winter time when pasture grasses are generally not available. In addition, forage can be harvested and stored during abundant times as a hedge against leaner times.

Forage processing machinery encompasses many different types of machinery used for different purposes. Examples of forage processing machinery are mowers, windrowers, mower conditioners, balers, etc. A mower includes a cutter bar and cuts the forage, with the forage lying where it falls. A windrower is essentially a mower that gathers the cut forage into a windrow. The forage harvester 110 is a machine that cuts or picks up forage, chops it into small pieces, and deposits the chopped forage (sometimes referred to as silage) into a trailing wagon. The chopped forage is generally fed into a blower that blows the chopped forage up a spout and into the wagon. A baler picks up cut forage and compresses it into a rectangular or round bale that is bound up with wire, twine, or a net wrap.

The availability of grain yield monitors, as opposed to yield monitors for forage crops, is due to the fact that the harvesting of grain is quite different from the harvesting of forage. For example, grain is typically small, fairly uniform in terms of size, density, moisture content, etc., where forage may include a wide variety of plant sizes, plant moisture content, leaf types, stem lengths, toughness, etc. Therefore, although much progress has been made in yield monitored devices for grain harvesting, forage harvesting has not seen such improvements. Based upon current techniques, the farmer can obtain yield values only on a per field basis.

What is needed, therefore, are yield monitors for forage processing machinery.

SUMMARY OF THE INVENTION

A yield monitor for a forage processing machinery is provided in accordance with one aspect of the invention. The yield monitor comprises a cross auger supported by at least one force measuring device. The at least one force measuring device generates a force signal substantially related to a forage mass flow rate. The yield monitor also includes a computer that receives the force signal and generates a yield amount using the force signal, a forage processing machinery groundspeed, and forage processing machinery intake parameters. A method for measuring a forage yield is also provided comprising the steps of generating a force signal due to a forage stream impinging on the cross auger and at least one force measuring device. The method generates a yield amount based upon the force signal, a forage processing machinery groundspeed, and forage processing machinery intake parameters.

A yield monitor for a forage processing machinery is provided in accordance with another aspect of the invention. The yield monitor comprises a spinner communicating with at least one force measuring device. The at least one force measuring device generates a force signal in response to a force on the spinner due to impingement by a forage stream, the force signal being substantially related to a forage mass flow rate. The yield monitor also includes a computer that receives the force signal and generates a yield amount using the force signal, a forage processing machinery groundspeed, and forage processing machinery intake parameters. A method for measuring a forage yield is also provided comprising the steps of generating a force signal due to a forage stream impinging on the spinner and at least one force measuring device in communication with the spinner. The method generates a yield amount based upon the force signal, a forage processing machinery groundspeed, and forage processing machinery intake parameters.

A yield monitor for a forage processing machinery is provided in accordance with yet another aspect of the invention. The yield monitor comprises a deflector shield affixed to at least one force measuring device. The deflector shield is positioned below a cutter head of a forage harvester to guide a forage stream leaving the cutter head. A forage stream impinges on the deflector shield and the at least one force measuring device. The at least one force measuring device generates a force signal substantially related to a forage mass flow rate. The yield monitor also includes a computer that receives the force signal and generates a yield amount using the force signal, a forage processing machinery groundspeed, and forage processing machinery intake parameters. A method for measuring a forage yield is also provided comprising the steps of generating a force signal due to a forage stream impinging on the deflector shield and the associated at least one force measuring device positioned below a cutter head of a forage harvester. The method generates a yield amount based upon the force signal, a forage processing machinery groundspeed, and forage processing machinery intake parameters.

A yield monitor for a forage processing machinery is provided in accordance with yet another aspect of the invention. The yield monitor comprises a transition stage within the forage processing machinery. The transition stage has a wide proximal opening and a narrow distal opening, with the distal opening gathering and channeling a forage stream flowing therethrough. The transition stage includes at least one hinged side panel communicating a forage stream impingement force to an associated at least one force measuring device. The at least one force measuring device generates a force signal substantially related to a forage mass flow rate. The yield monitor also includes a computer that receives the force signal and generates a yield amount based upon the force signal, a forage processing machinery groundspeed, and forage processing machinery intake parameters. A method for measuring a forage yield is also provided comprising the steps of generating a force signal due to a forage stream impinging force on a transition stage side panel. The side panel communicates the forage stream impinging force to an associated at least one force measuring device. The method also generates a yield amount based upon the force signal, the forage processing machinery groundspeed, and forage processing machinery intake parameters.

A yield monitor for a forage processing machinery is provided in accordance with yet another aspect of the invention. The yield monitor comprises a blower having a blower chamber and a blower spout extending substantially vertically away from the blower chamber. The blower spout includes a blower spout bend wherein the blower spout curves from a substantially vertical orientation to a substantially horizontal orientation, with a force measuring device and an associated impingement plate being located in the blower. The force measuring device generates a force signal substantially related to a forage mass flow rate. The yield monitor also includes a computer that receives the force signal and generates a yield amount using the force signal, a forage processing machinery groundspeed, and forage processing machinery intake parameters. A method for measuring a forage yield is also provided comprising the steps of generating a force signal substantially related to an impinging force of a forage stream, the force signal being generated by the impingement plate and the associated force measuring device positioned in a blower spout. The method generates a yield amount based upon the force signal, a forage processing machinery groundspeed, and forage processing machinery intake parameters.

A yield monitor for a forage processing machinery is provided in accordance with yet another aspect of the invention. The yield monitor comprises a roller and at least one associated force measuring device. The at least one associated force measuring device measures a separation force imparted on the roller by a forage stream and generates a force signal substantially related to a forage mass flow rate. The yield monitor also includes a computer that receives the force signal and generates a yield amount based upon the force signal, a forage processing machinery groundspeed, and forage processing machinery intake parameters. A method for measuring a forage yield is also provided comprising the steps of generating a force signal of a separation force imparted on a roller in a forage processing machinery. The method generates a yield amount based upon the force signal, a forage processing machinery groundspeed, and forage processing machinery intake parameters.

A yield monitor for a forage processing machinery is provided in accordance with yet another aspect of the invention. The yield monitor comprises an upper roller of a pair of rollers and an ultrasonic displacement measuring device that measures a displacement of the upper roller and generates a displacement signal substantially related to a forage mass flow rate and without contacting the upper roller. The yield monitor also includes a computer that receives the displacement signal and generates a yield amount based upon the displacement signal, a forage processing machinery groundspeed, and forage processing machinery intake parameters. A method for measuring a forage yield is also provided comprising the steps of generating a displacement signal of a displacement of a roller in forage processing machinery. The displacement signal is generated by an ultrasonic displacement measuring device and is substantially related to a forage mass flow rate The method generates a yield amount based upon the displacement signal, a forage processing machinery groundspeed, and forage processing machinery intake parameters.

A yield monitor for a forage processing machinery is provided in accordance with one aspect of the invention, the yield monitor comprises an impeller hood extending over an impeller, with the hood being hinged to the forage processing machinery and communicating a forage stream impingement force to an associated at least one force measuring device. The at least one force measuring device generates a force signal substantially related to a forage mass flow rate. The yield monitor further includes a computer that receives the force signal and generates a yield amount based upon the force signal, a forage processing machinery groundspeed, and forage processing machinery intake parameters. A method for measuring a forage yield is also provided, comprising the steps of generating a force signal due to a forage stream impinging force on an impeller hood. The impeller hood communicates the forage stream impinging force to an associated at least one force measuring device. The method generates a yield amount based upon the force signal, the forage processing machinery groundspeed, and forage processing machinery intake parameters.

A yield monitor for a forage processing machinery is provided in accordance with yet another aspect of the invention. The yield monitor comprises a swath shield communicating an impingement force to an associated at least one force measuring device. The at least one force measuring device generates a force signal substantially related to a forage mass flow rate. The yield monitor also includes a computer that receives the force signal and generates a yield amount based upon the force signal, a forage processing machinery groundspeed, and forage processing machinery intake parameters. A method for measuring a forage yield is also provided comprising the steps of generating a force signal substantially related to an impinging force of a forage stream impinging on a swath shield. The method generates a yield amount based upon the force signal, the forage processing machinery groundspeed, and forage processing machinery intake parameters.

In accordance with yet another aspect of the invention, a yield monitor for a forage processing machinery is provided, which comprises a drive load measuring device affixed to a drive device of the forage processing machinery. The drive load measuring device generates a drive load signal related to a forage mass flow rate. The yield amount is generated using the drive load signal, wherein a computer is capable of generating a yield amount based upon the drive load signal, a forage processing machinery groundspeed, and forage processing machinery intake parameters. A method for measuring a forage yield is also provided, comprising the steps of generating a drive load signal related to a mass flow rate of a forage stream feeding into the forage processing machinery and generating a yield amount based upon the drive load signal, the forage processing machinery groundspeed, and forage processing machinery intake parameters.

A yield monitor for a forage processing machinery is provided in accordance with yet another aspect of the invention. The yield monitor comprises a blower having a blower chamber and a blower spout extending substantially vertically away from said blower chamber. The blower spout includes a blower spout bend wherein the blower spout curves from a substantially vertical orientation to a substantially horizontal orientation. A forage stream distance measuring device is located in the blower spout after the blower spout bend, with the forage stream distance measuring device generating a distance signal substantially related to a forage mass flow rate. The yield monitor also includes a computer that receives the distance signal and generates a yield amount based upon the distance signal, a forage processing machinery groundspeed, and forage processing machinery intake parameters. A method for measuring a forage yield is also provided comprising the steps of generating a distance signal substantially related to a distance to a forage stream in a blower spout. The distance signal is generated by an ultrasonic distance sensor positioned in the blower spout. The method generates a yield amount based upon the distance signal, the forage processing machinery groundspeed, and forage processing machinery intake parameters.

In accordance with yet another aspect of the invention, a yield monitor for a forage processing machinery is provided, which comprises a volume increment accumulation measuring device generating a volume increment accumulation signal substantially related to a forage mass. A computer receives the volume increment accumulation signal and generates a yield amount based upon the accumulation signal, forage processing machinery intake parameters, and a forage accumulating machinery groundspeed. A method for measuring a forage yield is also provided, comprising the steps of generating a forage volume accumulation movement signal substantially related to a movement of an accumulated forage stream accumulating in the forage processing machinery, and generating a yield amount based upon the forage accumulation movement signal, forage processing machinery intake parameters, and the forage processing machinery groundspeed.

In accordance with yet another aspect of the invention, a computer-implemented method for providing a yield feedback in a forage processing machinery is provided. The method comprises the steps of determining in a first computer a forage mass flow rate through the forage processing machinery, receiving in the first computer a groundspeed measurement of a forage processing machinery groundspeed, calculating in the first computer a yield amount using the mass flow rate and the groundspeed measurement, generating in the first computer a groundspeed control signal from the yield amount, and controlling the foraging processing machinery groundspeed with a second computer to substantially equal the groundspeed control signal.

The above and other features and advantages of the present invention will be further understood from the following description of the preferred embodiments thereof, taken in conjunction with the accompanying drawings.

BRIEF DESCRIPTION OF THE DRAWINGS

FIG. 17 is a flowchart of a visual yield feedback process aspect of the present invention; and FIG. 18 is a flowchart of an automatic groundspeed control signal generation process aspect of the present invention.

DETAILED DESCRIPTION OF THE PREFERRED EMBODIMENTS

In accordance with the present invention, a yield monitor is provided that measures a forage impingement force, a forage volume, a forage drive loading, or a forage volume increment accumulation in order to provide a mass flow rate. The mass flow rate may be used to generate the yield amount. The yield amount may also be based upon a forage processing machinery groundspeed and forage processing machinery intake parameters. Forage processing machinery intake parameters may include, for example, a forage cut width or a pickup width, an average forage stream instantaneous volume (i.e., an average volume of a windrow segment), a rotating drive speed (i.e., a feed roller speed, a conditioner roller speed, a conditioner impeller speed, a blower speed, etc.), a roller clearance, a forage steam speed, a cutter head speed, a swath shield position, a forage moisture content, a length of cut, a cutterhead position, a machine angle, a spout position, a cutting angle, a bale cross-sectional area, a bale chamber density/pressure, etc.

Each of these measurement types are discussed in turn below, generally in conjunction with a specific type of forage processing machinery. However, it should be understood that the yield monitor of the present invention is not limited to a specific machine, and may apply to any forage processing machinery having generally the recited apparatus or apparatus arrangement.

Force

In a first general category of forage yield monitors, a force measurement may be used to determine a mass flow rate. The force measurement generally measures an impinging force of cut or processed forage on a device within the forage processing machinery. The force may be measured as an impingement of a forage stream on a plate or other part of the forage processing machinery, including moving or rotating parts. The force measurement is substantially related to the mass, especially in cases where the force measuring device is substantially horizontal and measures a downward force imposed due to forage mass, which is equivalent to the weight (assuming a standard sea level force of gravity).

Figure 1:
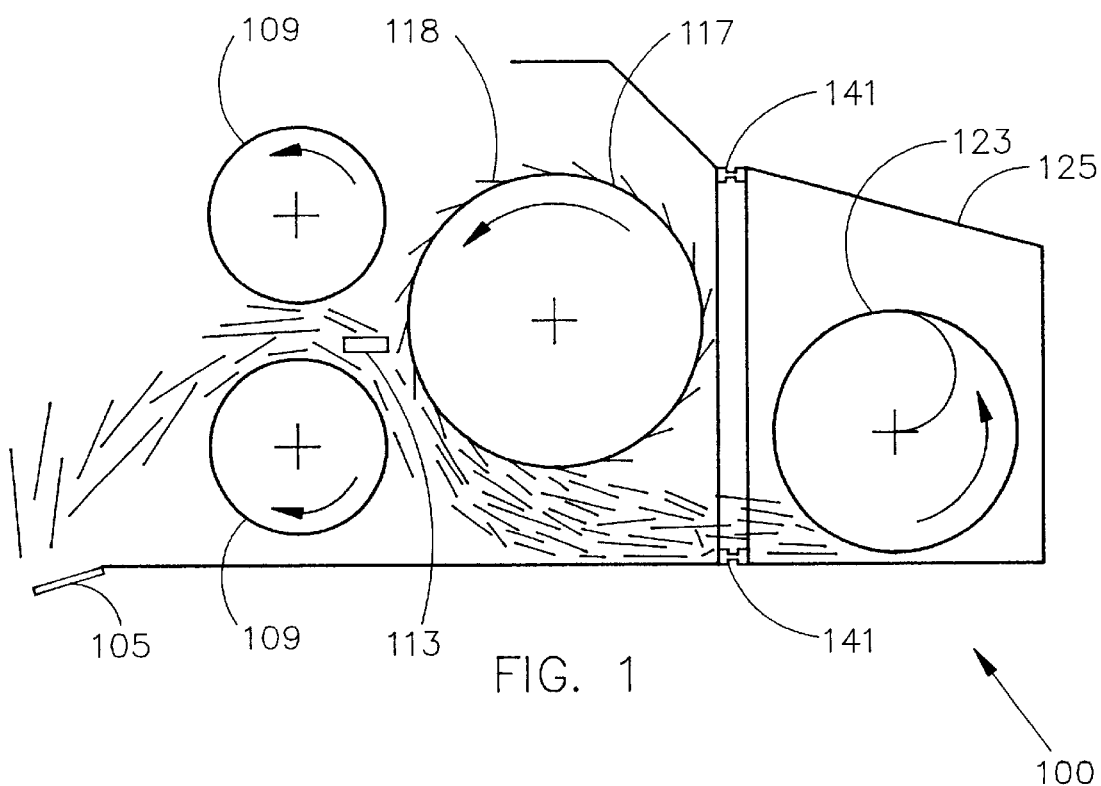
FIG. 1 shows a first force embodiment of a forage harvester yield monitor.

FIG. 1 shows a first force embodiment of a forage harvester yield monitor. The figure shows a section of a forage harvester 110. The forage harvester 110 includes a cutter 115 (or optionally a tine pickup device that picks up a forage windrow, for example), a pair of feed rollers 109, a shearbar 113, a cutter head 117 having a plurality of cutting edges 118, and a cross auger 123.

In use, cut or picked up forage passes through the rotating feed rollers 109, over the shearbar 113, and is chopped up by the rotating cutter head 117. The chopped silage then travels into the rotating cross auger 123, which transports the chopped forage into a blower (not shown) for transport into a wagon.

Typically the cross auger 123 is a rotating device having a helical blade that transports the chopped forage into the blower. The cross auger 123 therefore moves or transports all chopped forage and is a good location in which to measure force. Forage transported by the cross auger 123 exerts a weight on the cross auger 123 and a supporting frame 125. The cross auger 123 may be supported by force measuring devices 141, such as strain gauges, force transducers, or load cells, which can be used to detect the difference between a normal unloaded weight and a loaded weight of the cross auger 123. Therefore, sensing the mass of the forage as it is transported gives a substantially instantaneous mass flow rate measurement.

The cross auger 123 may be, for example, chain driven, but preferably is hydraulically driven so that the torque on the cross auger 123 due to the drive mechanism does not affect the mass measurement.

The force measuring device 141 may be any type of electrical device that produces an electrical output signal in response to an impinging force. This may include, for example, strain gauges, load cells, pressure transducers, etc. One example is a 4,450 Newton capacity "S" type load cell. The force measuring device is generally affixed to a device or device component that receives the impinging force to be measured.

The force measuring device or devices supporting the supporting frame 125 generates a voltage measurement that may be translated into engineering units or a force measurement. The voltage translation may be determined according to specifications supplied by the device manufacturer.

The sensor outputs in these and subsequent equations are expressed in terms of common force, distance, and speed values. This allows the equations to be used with a variety of sensors, with the sensor outputs being capable of being converted from voltage values to force, distance, speed, etc.

In addition to the force signal on the cross auger 123, forage processing machinery intake parameters includes the cutterhead speed input. The mass flow rate, in conjunction with a groundspeed and a cut or pickup width (or in the case of a forage processing machinery that picks up a windrow, a cut width for a windrow), may be used to generate a yield amount on a per cell basis. The moisture content, length of cut, and cutterhead position may optionally be included in the mass flow rate determination.

It should be understood that the forage processing machinery groundspeed is needed in all aspects of the forage monitor, including those discussed below, so that a generated yield amount may be recorded on a per cell basis. The groundspeed is therefore needed in order to relate the yield amount to an area of the field.

Multiple regression analysis may be used to generate an equation that may be used in a yield monitor. The multiple regression analysis may use yield monitor sensor outputs as independent variables and wet or dry mass flow rate as a dependent variable.

The yield monitor of this and other embodiments may generate and store yield data for individual cells of a field, and may be capable of downloading data to other devices for analysis. The yield monitor of the present invention may work with or incorporate a device for setting up field and cell boundaries, such as a global positioning system (GPS) receiver.

The impinging force signal may be received by a computer, and combined with a forage processing machinery groundspeed to form the yield amount. In addition, the measurement accuracy may be calibrated by using a calibration table, a calibration curve, or other calibration data to more reliably correlate a sensor output to a yield amount. For example, a plurality of tables could contain data for a plurality of forages, at a plurality of moisture contents, for a plurality of forage processing machinery types. Such calibration data may therefore relate a measured force to a forage mass flow rate while taking into account variables such as moisture content, cut width, forage type, groundspeed, a sensor type, a sensor location, a forage processing machinery type, etc. In addition, for more accurate detail a larger number of weight measurements may be stored and/or averaged.

The yield monitor may comprise, for example, a Gateway 2100 Solo® portable computer using the Windows 95® operating system. The data may be collected and manipulated using LabVIEW® software. A National Instruments DAQ700 PCMCIA card may be used to perform analog-to-digital conversions. A NIDAQ driver software may be used to control data acquisition. A National Instruments 6B module backplane may be used with load cells to provide amplification. The 6B module backplane includes strain gauge input modules that isolate strain gauge inputs and provide a 11 volt signal excitation, a maximum signal input of plus or minus 30 millivolts, and a fixed ratio amplification gain of 177 for a plus or minus 6 volts maximum output. A large square baler may require three frequency counts, such as a 6B45 frequency input module with an input frequency range of 0–5 kHz. The 6B module may be plugged into an 9 channel backplane powered by a 6 volts DC, 6 amp power supply. All 6B backplane output signals may be single-ended ground referenced. Single ended high level signals and other pulse counts may be wired into a connector block. The connector block and the 6B backplane may be coupled to a SC2055 cable adapter via 60 and/or 26 pin flat cables. This cable adapter may provide data to a DAQ700 PCMCIA card in a portable computer. Sensors that require excitation without dedicated 6B modules may be excited at either 6 volts DC (i.e., a potentiometer or pressure transducer), or 14.8 volts DC (i.e., a moisture sensor or optical encoder) with an off-the-shelf DC power supply.

Signals from the sensors may be sampled at a rate of about 110 Hz. In addition, the data points may be averaged, such as averaging 60 points to produce 2 recorded data points per second. Sampling and averaging rates may be controlled, for example, in the aforementioned LabVIEW® software.

Figure 2:
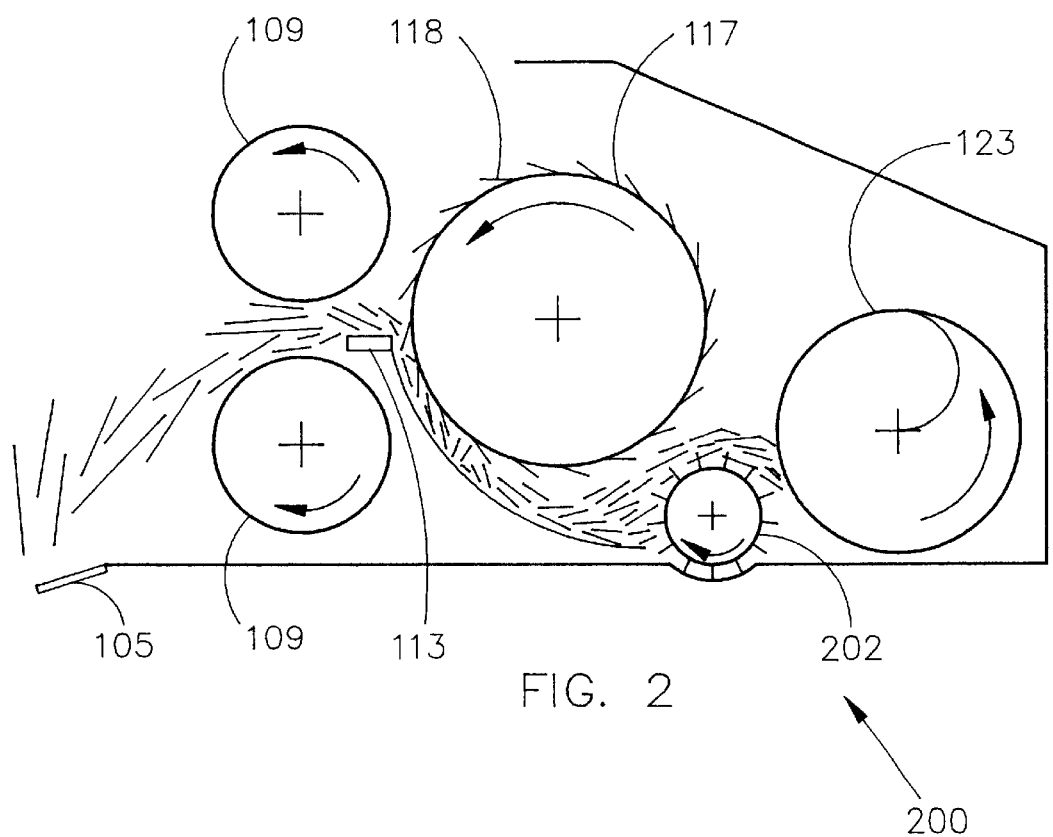
FIG. 2 shows a second force embodiment.

FIG. 2 shows a second force embodiment of a forage harvester yield monitor 200. In this embodiment, a spinner 202 is located near the cutter head 117. Forage leaving the cutter head 117 travels over the spinner 202 before being deposited into the cross auger 123. In one embodiment, the spinner 202 may be powered in order to move the forage stream toward the cross auger 123. In another embodiment, the spinner 202 may be unpowered and may rotate due to forage impact.

As in the cross auger 123, the spinner 202 is supported by one or more force measuring devices, such as strain gauges or load cells. Vertically positioned force measuring devices may support bearings at either end of the powered spinner 202 to generate a force signal. Alternatively, one or more force measuring devices may be horizontally located adjacent to a spinner shaft or spinner bearings in order to detect a side load imposed on the spinner 202 by forage impact. The force may be related to a mass flow rate.

In addition to the force signal on the spinner 202, forage processing machinery intake parameters includes the cutterhead speed as an input. The mass flow rate, in conjunction with a groundspeed and a cut or pickup width, may be used to generate a yield amount on a per cell basis. The moisture content, length of cut, and cutterhead position may optionally be included in the mass flow rate determination.

Figure 3:
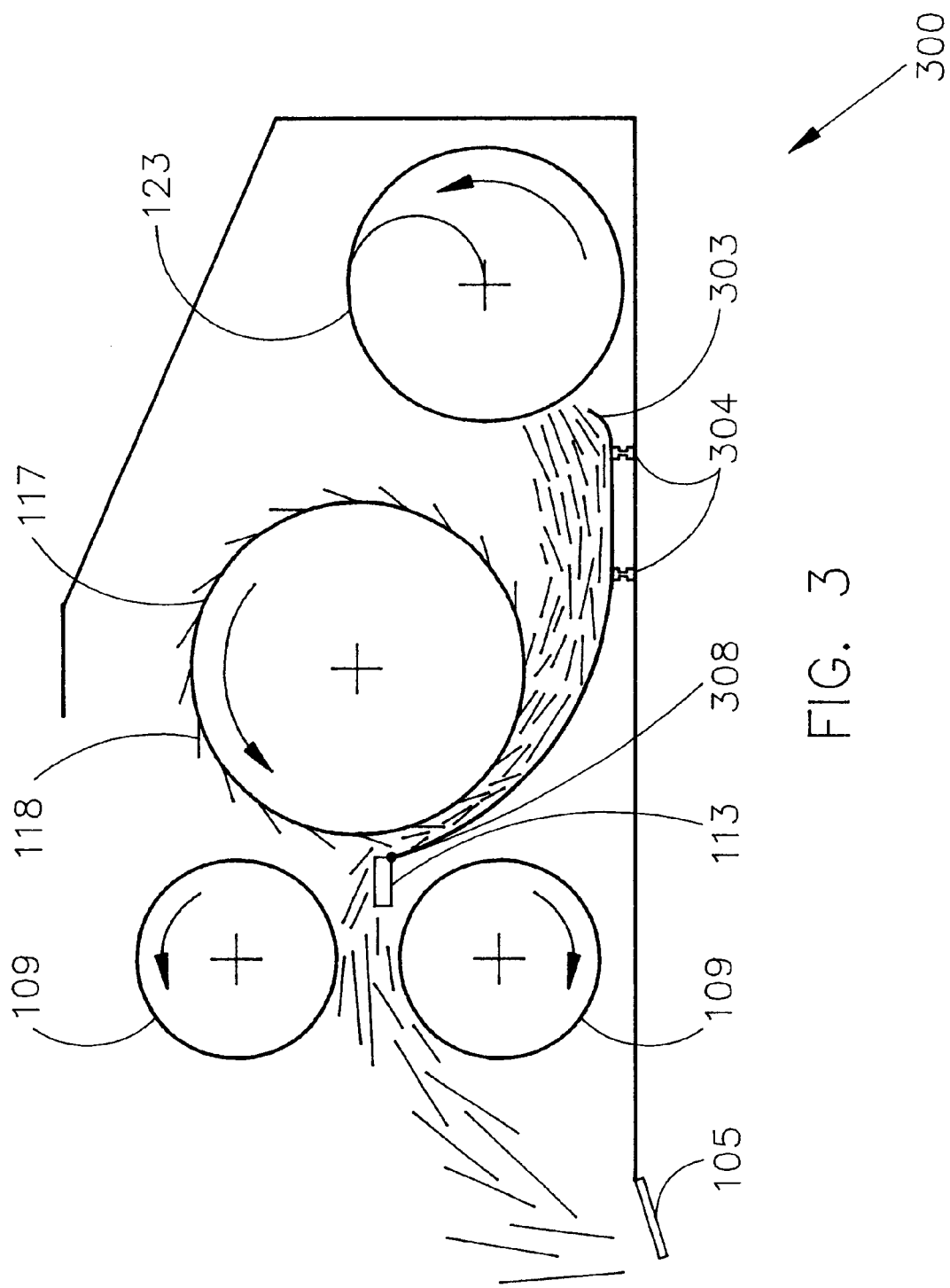
FIG. 3 shows a third force embodiment.

FIG. 3 shows a third force embodiment of a forage harvester yield monitor 300. A deflector plate 303 may be located below and between the cutter head 117 and the cross auger 123, and supported by one or more force measuring devices 304. The force measuring devices 304 may be, for example, strain gauges or load cells, etc. Therefore, material leaving the cutter head 117 impinges upon the deflector plate 303.

In the embodiment shown, the deflector plate 303 is not connected to the shearbar 113, and instead is independently supported by two or more force measuring devices 304. In an alternate embodiment, the deflector plate 303 may be supported by a single force measuring device 304 while being pivotally attached to the shearbar 113, or to any convenient frame member. The pivotal attachment may be a hinge 308, for example.

The deflector plate 303 is therefore isolated from the main frame so that the impingement force of the forage stream can be determined. The impingement force is substantially related to the mass flow rate of the material leaving the cutter head 117. Therefore, the impingement force may be related to yield.

In addition to the force signal on the cross auger 123, forage processing machinery intake parameters includes the cutterhead speed input. The mass flow rate, in conjunction with a groundspeed and a cut or pickup width, may be used to generate a yield amount on a per cell basis. The moisture content, length of cut, and cutterhead position may optionally be included in the mass flow rate determination.

The wet mass flow rate (WMFR) for the hinged impact plate for alfalfa may be determined through the use of the equation:

$$WMFR=3.74+(0.16*IPF)-(5.39E-3*CHS)+(1.97E-2*MC) \quad (1)$$

The dry mass flow rate (DMFR) for the hinged impact plate for alfalfa may be determined through the use of the equation:

$$DMFR=7.24+(6.29E-2*IPF)-(2.80E-3*CHS)-(7.53E-2*MC) \quad (2)$$

The wet mass flow rate (WMFR) for the hinged impact plate for corn silage may be determined through the use of the equation:

$$WMFR=-8.89+(0.34*IPF)-(2.47E-3*MC) \quad (3)$$

The dry mass flow rate (DMFR) for the hinged impact plate for corn silage may be determined through the use of the equation:

$$DMFR=0.15+(0.14*IPF)-(8.46E-2*MC) \quad (4)$$

The DMFR equation may be used when the yield amount of the forage without the water is desired. The WMFR is important for impact plate embodiments of the yield monitor because the impact force is equal to the dry matter impact force plus the water impact force.

The forage yield amount may be alternatively determined from the impingement plate force measurement using the equations:

$$WMFR=-28.52+(0.19*IPF)+(0.11*MC)+(2.01E-2*RPM)+(0.07*LOC) \quad (5)$$

and $$DMFR=-8.61+(8.07E-2*IPF)+(8.19E-3*MC)+(6.99E-3*RPM)+(0.034*LOC) \quad (6)$$

where IPF is the measured impingement force, MC is the forage moisture content, RPM is the feedroller rotational speed, and LOC is the length-of-cut of the forage.

Figure 4:
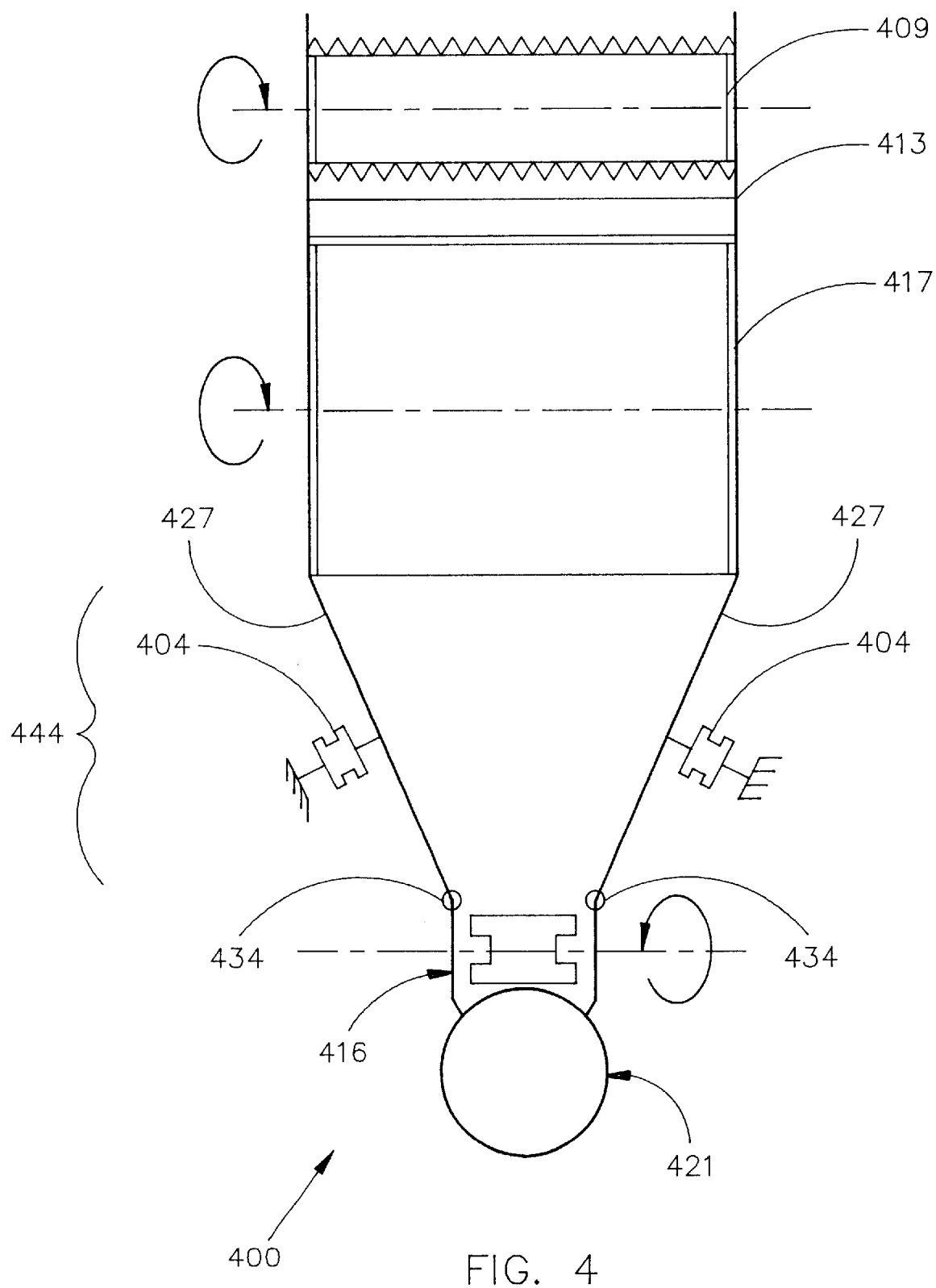
FIG. 4 shows a fourth force embodiment.

FIG. 4 shows a fourth force embodiment of a forage harvester yield monitor 400. Instead of a cross auger, the forage harvester in this embodiment includes a transition stage 444 that funnels the forage stream into a blower 416 where it is blown up a spout 421. The transition stage 444 includes side panels 427 that may be pivotally attached to the forage harvester by hinges 434. Force measuring devices 404 are in contact with the side panels 427. The force measuring devices 404 may be, for example, strain gauges or load cells, etc. The force measuring devices 404 generate impingement force signals that are substantially related to a forage mass flow rate through the forage harvester. Although two force measuring devices 404 are shown, it should be understood that any number of side panels 427 and force measuring devices 404 may be used.

The side panels 427 may be hinged as shown, or alternatively may be unhinged and freestanding and may be supported by two or more force measuring devices 404.

In addition to the force signal on a side panel 427, forage processing machinery intake parameters includes the cutterhead speed input. The mass flow rate, in conjunction with a groundspeed and a cut or pickup width, may be used to generate a yield amount on a per cell basis. The moisture content, length of cut, cutterhead position, and spout position may optionally be included in the mass flow rate determination.

Figure 5:
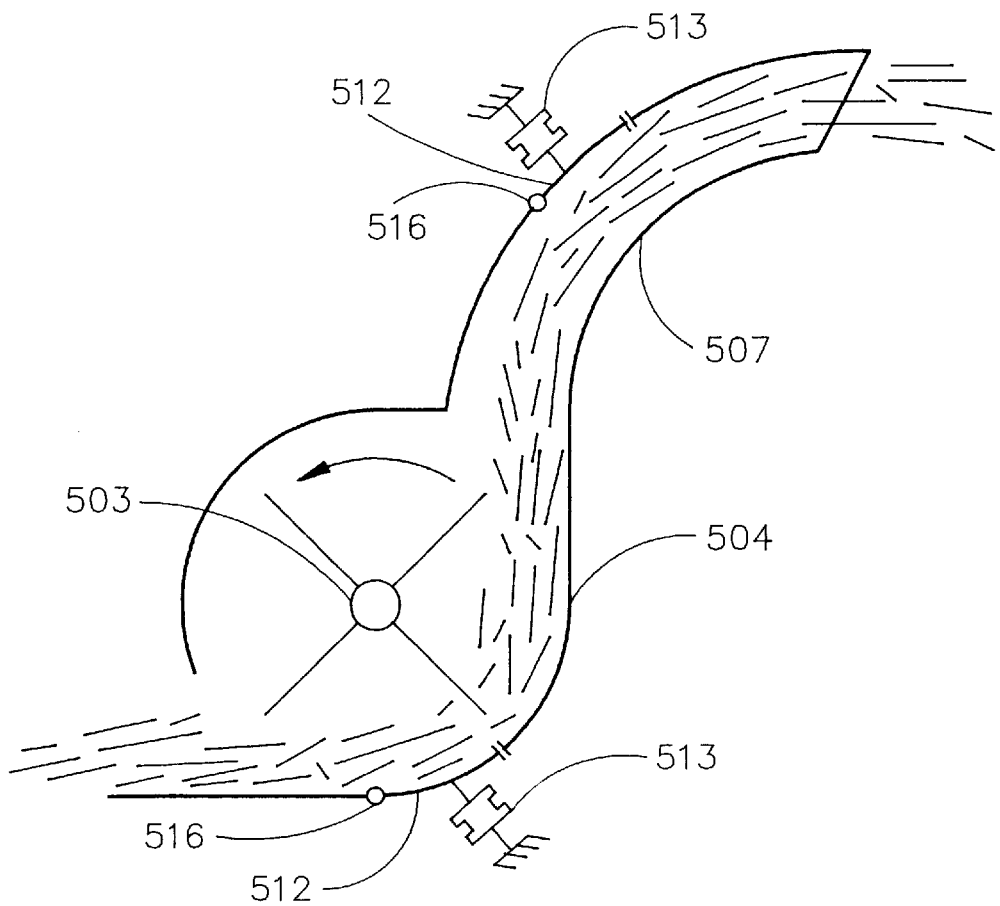
FIG. 5 shows a force measurement embodiment for a forage blower component.

FIG. 5 shows a force measurement embodiment for a forage blower component. A forage harvester may use a blower 503 to transport processed forage into a wagon, etc. The blower 503 rotates within a blower housing 504 and the resulting airflow picks up and transports the forage through a spout 507. A deflector plate 512, similar to that previously discussed, may be placed at the bottom curve of the blower housing 504 or in a bend of the spout 507. The deflector plate 512 communicates an impingement force to a force measuring device 513. The deflector plate 512 may be supported by a single force measuring device 513 and may be attached to the spout 507 by a hinge 516. Alternatively, the deflector plate 512 may not be attached to the spout 507 and may be supported by two or more force measuring devices 513.

In addition to the force signal generated by the force measuring device 513, forage processing machinery intake parameters includes cutterhead speed and blower speed inputs. The mass flow rate, in conjunction with a groundspeed and a cut or pickup width, may be used to generate a yield amount on a per cell basis. The moisture content, length of cut, cutterhead position, and spout position may optionally be included in the mass flow rate determination.

Figure 6:
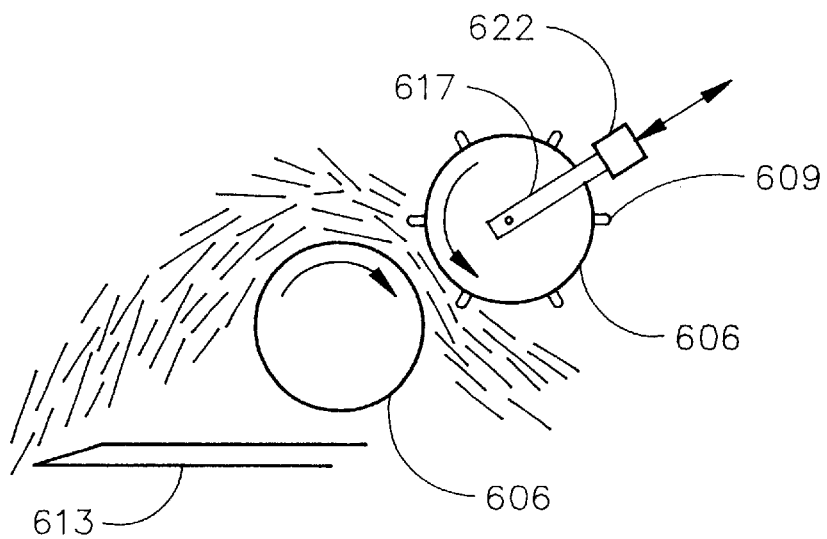
FIG. 6 shows a first embodiment of a yield monitor for a forage processing machinery having a pair of rollers.

FIG. 6 shows a first embodiment of a yield monitor for a forage processing machinery having a pair of rollers, such as, for example, a roller type mower conditioner. The roller type mower conditioner includes rollers 606 that rotate, with the forage passing between the rollers 606. The rollers 606 may include flutes 609, which serve to break or crimp the forage stems. Alternatively, the rollers 606 may be smooth, and the forage stems are crushed or smashed as the forage passes between the rollers 606.

Many forage crops are cut and field wilted prior to harvest. The mower conditioner combines the cutting function and a conditioning function, and is typically used to speed drying of a cut forage. If forage is harvested when it contains a lot of moisture, it may rot or mold. Because forage stems and leaves dry at different rates, cut forage must lay in the field for a long period of time to dry. This makes the drying crop vulnerable to other problems, such as rain, humidity, or runoff. The function of the conditioner is to break open the stems of the forage in some way to allow the moisture to escape quicker, preferably at about the same rate as the moisture escapes from the leaves.

There are three common methods for mechanically conditioning forage; crimping or bending the stem until it breaks, crushing or smashing the stem to break its waxy surface layer, or abrading or rubbing the stem to remove much of the stem's waxy layer. Once the surface layer is opened, moisture will escape.

In roller type mower conditioners, the bottom conditioner roller is generally fixed in position while the top roller floats to accommodate variations in the forage stream. However, the top roller is biased by a separation force to remain at a predetermined clearance distance or gap, generally by coil springs, torsional springs, air bags, hydraulic cylinders, etc. Therefore, an essentially constant force is maintained on the forage stream despite variations in the yield amount.

The figure shows a first embodiment of a yield monitor for roller type mower conditioner. In this embodiment, the conditioning force is determined by measuring the separation force on the movable roller. The separation force may be correlated to a mass flow of forage passing between the conditioner rollers 606.

The roller separation force may be measured by one or more force measuring devices 622 installed in series with a linkage or biasing device 617. The roller separation force on the biasing device or devices 617, such as that generated by springs, torsional springs, coil springs, hydraulic cylinders, airbags, etc., is substantially related to the forage quantity and therefore to the forage mass.

In addition to the force signal on the conditioner roller 606, forage processing machinery intake parameters includes a conditioner roller speed input. The mass flow rate, in conjunction with a groundspeed and a cut or pickup width, may be used to generate a yield amount on a per cell basis. The moisture content, roll displacement, cutting angle, and machine angle (essentially the slope of the ground the machine is on) may optionally be included in the mass flow rate determination.

The dry mass flow rate (DMFR) of the forage may be obtained from the equation:

$$DMFR=5.29E-3*CRSF-5.17*CRS; \quad (7)$$

where CRSF is the measured conditioner roller separation force and CRS is the conditioner roller speed.

The forage harvester is similar to the mower conditioner in that it may also include a pair of vertically spaced rollers. In the forage harvester these rollers are feed rollers and function to transport a forage stream. As discussed above for the conditioner roller, the displacement or separation force on an upper feed roller may likewise be measured in order to generate a yield amount. The feed rollers are also biased in order to preferably remain a predetermined distance apart. As in the mower conditioner, the feedroller spring force may be measured and used to determine a yield amount.

For a feedroller spring force measurement, the feedroller spring force may be used to obtain the yield amount through use of the equations:

$$WMFR=-47.72+(3.18E-3*FRSF)+(0.17*MC)+(3.84E-2*RPM)+ \\ (0.25*LOC) \quad (8)$$

and $$DMFR=-16.18+(1.43E-3*FRSF)+(0.04*MC)+(1.39E-2*RPM)+ \\ (0.11*LOC) \quad (9)$$

where FRSF is the measured feedroller spring force in Newtons, MC is the forage moisture content in percent wet, RPM is the feedroller rotational speed in revolutions per minute, and LOC is the length-of-cut of the forage in millimeters.

Figure 7:
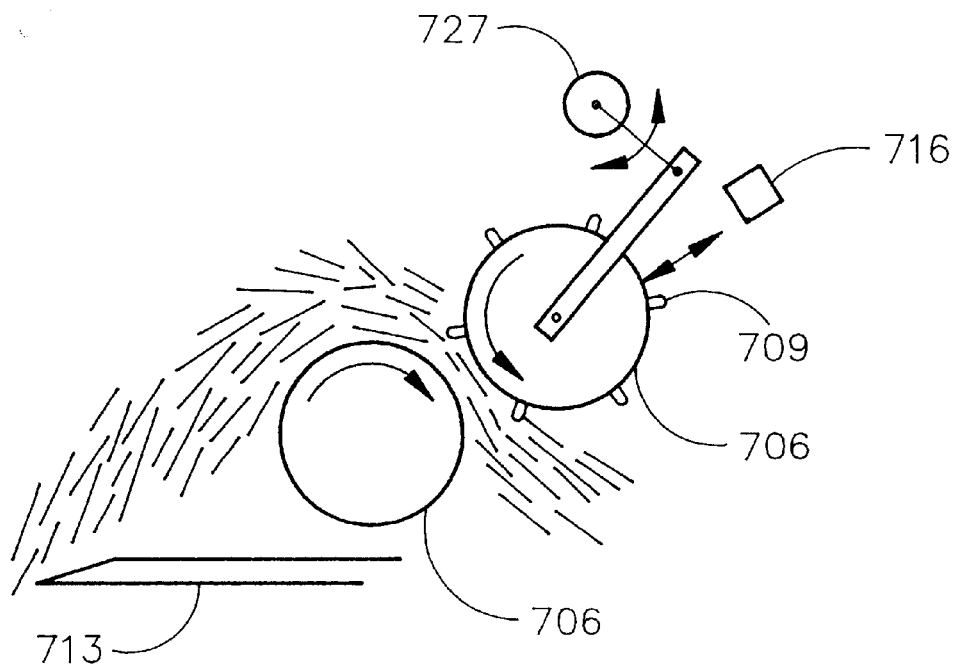
FIG. 7 shows a second embodiment of a yield monitor for a forage processing machinery having a pair of rollers.

FIG. 7 shows a second embodiment of a yield monitor for a forage processing machinery having a pair of rollers. As in the previous embodiment, the rollers 706 rotate to pass through a forage stream. In use, the rollers 706 are displaced according to the forage volume, and therefore the displacement is substantially related to the forage yield. The feed roller displacement measurement may be made through a depth sensor 716, such as, for example, an ultrasonic position transducer or linear variable differential transformer. The depth sensor 716 provides a displacement measurement that is related to a mass flow rate through the feed rollers 706.

An ultrasonic sensor offers the advantage of a displacement measurement capability without a physical link to a feed roller or a conditioner roller. In addition, an ultrasonic sensor may be added to a forage processing machinery without the need for modifications to the existing structure. The ultrasonic sensor may be merely attached to the forage processing machinery at a convenient location.

In addition to the roll displacement signal on the conditioner roller 706, forage processing machinery intake parameters includes a roller speed input. The mass flow rate, in conjunction with a groundspeed and a cut or pickup width, may be used to generate a yield amount on a per cell basis. The moisture content, separation force, cutting angle, and machine angle may optionally be included in the mass flow rate determination.

Alternatively, the displacement may be measured by one or more rotary potentiometers 727 linked to a biasing device or biasing device mount, wherein the linkage is preferably hinged and provides a maximum rotational potentiometer travel without exceeding a potentiometer travel range. The potentiometer 727 provides an analog electrical output signal that varies as the potentiometer shaft is rotated. For example, a potentiometer may be used having a 55 degree active measuring range, linked to a spring mount of a coil spring (not shown).

The potentiometer used to measure conditioner roller displacement generates an analog voltage output that may be converted into a displacement measurement D (in millimeters) through the use of the equation:

$$\text{Left Displ.} = (0.38*V^6 - 6.71*V^5 + 49.25*V^4 - 190.95*V^3 + 413.92*V^2 - 4560.10*V + 195.7)*0.69 \quad (10)$$

$$\text{Right Displ.} = (0.20*V^6 - 3.67*V^5 + 27.85*V^4 - 112.29*V^3 + 254.98*V^2 - 291.87*V + 128.32)*0.69 \quad (11)$$

Therefore, the DMFR of the forage may be obtained from the equation:

$$DMFR = 23.4 + (0.61*CRD) - (5.36E - 2*CRS) \quad (12)$$

where CRD is the conditioner roller displacement and CRS is the conditioner roller speed.

Although the discussion above is given for a conditioner roller in a mower conditioner forage processing machinery, it should be understood that the yield monitor may also apply to a displacement of an upper feed roller that may move with respect to a lower feed roller, such as, for example, in a forage harvester.

Figure 8:
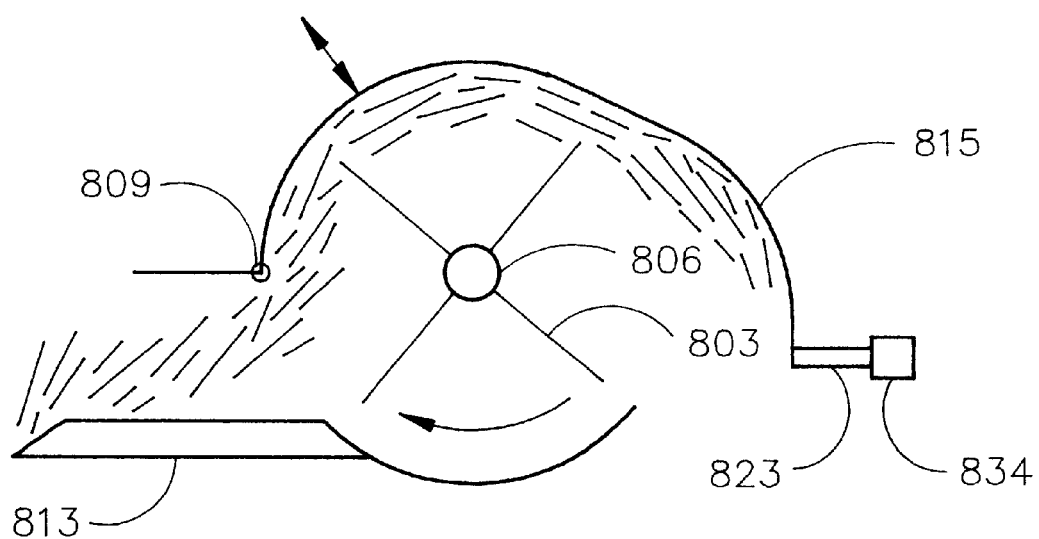
FIG. 8 shows a yield monitor according to the present invention for an impeller or tine type mower conditioner.

FIG. 8 shows a yield monitor according to the present invention for an impeller or tine type mower conditioner. Tine type conditioners usually include steel or rubber fingers 803 freely swinging from a rotating hub 806. The free-swinging fingers 803 carry the forage over the hub 806 and against an adjustable conditioning hood 815. The abrasive action of stems rubbing against the hood 815 and other stems removes the waxy layer from the stem. Fingers may additionally pass through a comb section to increase conditioning. The hood 815 may include a hinge 809 that allows a conditioning level to be adjusted by adjusting the clearance of the hood 815. Although a specific configuration is shown, it should be understood that different makes and models may vary in shape and placement of the components.

Forage leaving the conditioning mechanism will have energy by virtue of its mass and the velocity imparted by the conditioning mechanism. The conditioned forage is typically directed at the hood 815 either for the purpose of facilitating conditioning or to change the direction of the crop to form a swath or windrow. The hood 815 is typically situated above the crop flow such that the crop is deflected slightly downward into the conditioning mechanism or into a windrow forming shield. The impact force on the hood 815 will be a function of the mass flow rate, the position of the hood 815 relative to the conditioning mechanism, and the velocity imparted by the conditioning mechanism. In addition, the mass flow rate of the crop will also be a function of cut width and groundspeed. The groundspeed may be provided by a groundspeed sensor, by the forage processing machinery, or by a tractor (if the forage processing machinery is not self-propelled).

Forage impact on the hood 815 can be determined in several ways. The hood 815 can be pivoted for adjustment and will be restrained in a set position by means of a lever, pin, link or hydraulic cylinder 823. A force measuring device 834 can be placed at the restraining point such that restraining force required to overcome the impact force is measured. Alternatively, a potentiometer or similar device may measure the slight deflection or movement of the hood 815 due to impact force. The extent of travel may be related to impact force and therefore crop yield.

In addition to the force signal on the hood 815, forage processing machinery intake parameters includes impeller speed and hood position inputs. The mass flow rate, in conjunction with a groundspeed and a cut or pickup width, may be used to generate a yield amount on a per cell basis. The moisture content may optionally be included in the mass flow rate determination.

Figure 9:
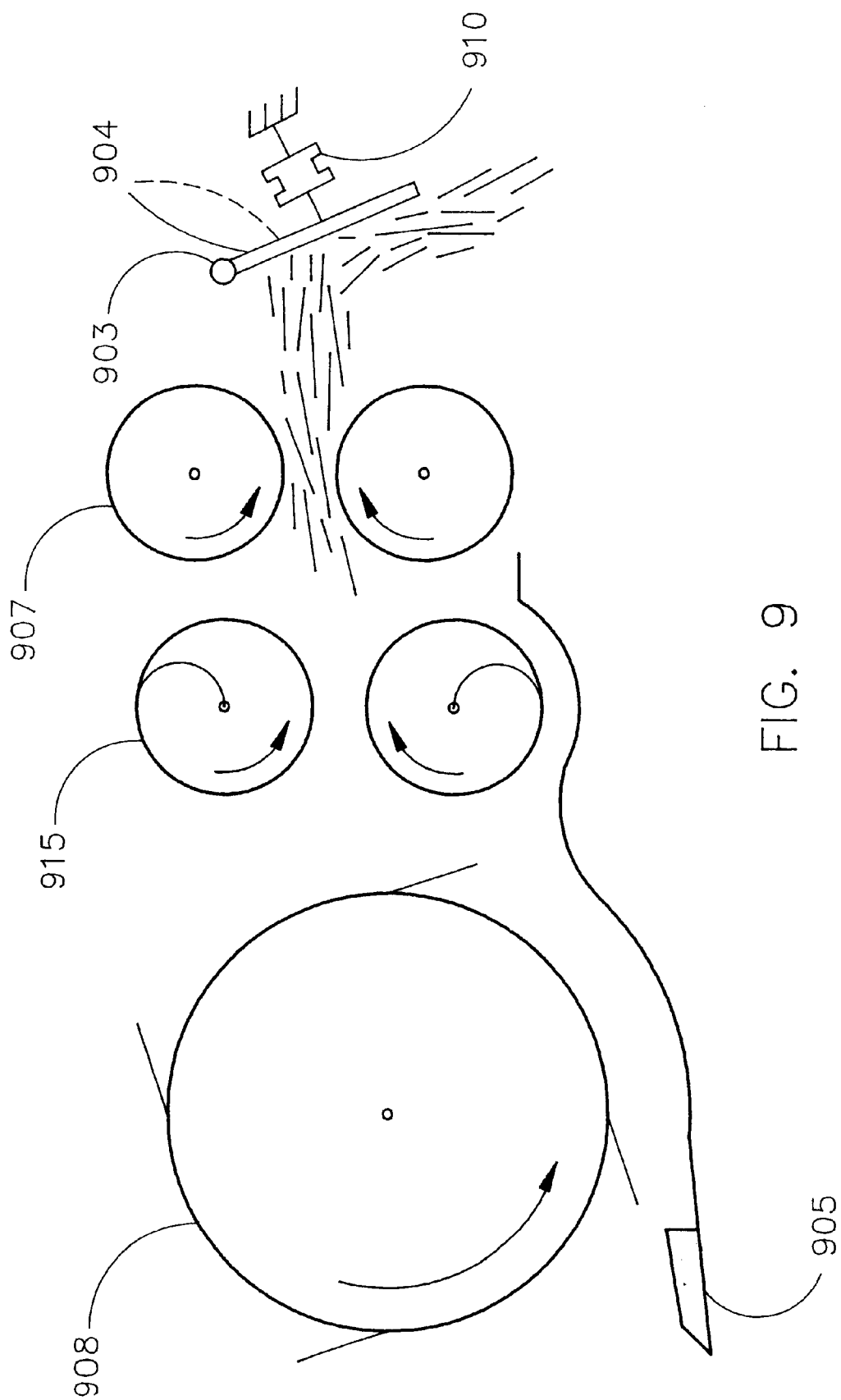
FIG. 9 shows a force measuring yield monitor embodiment that measures an impingement force on a swath shield.

FIG. 9 shows a force measuring yield monitor embodiment that measures an impingement force on a swath shield 904. In this embodiment, the forage processing machinery includes a cutterbar 905, such as a sickle or disk type, an optional feeding reel 908, converging augers 915, conditioner rollers 907, the swath shield 904, and a force measuring device 910 in contact with the swath shield 904. The swath shield 904 may include a hinge 903 that allows the swath shield 904 to be pivoted between various positions in order to control a width of a windrow produced by the forage processing machinery. The force measuring device 910 may be placed in series with a shield support or shield incidence setting device.

Typically, when the swath shield 904 is in a substantially vertical position, the resulting windrow is at its widest, as the forage may simply fall to the ground. When the swath shield 904 is rotated up to form a lesser angle with the horizontal, the forage stream hits one or more windrow converging shields (not shown) that form a narrower windrow.

In an alternate embodiment, the forage processing machinery may include an impeller type forage conditioner. It should be understood that the various components listed above are given to illustrate one type of forage processing machinery that employs a swath shield 904. The swath shield may be included on other types of forage processing machinery.

In addition to the force signal on the swath shield 904, forage processing machinery intake parameters includes a cutting angle, a machine angle, an angle of incidence of the shield, and a roller/impeller speed input. The mass flow rate, in conjunction with a groundspeed and a cut or pickup width, may be used to generate a yield amount on a per cell basis. The moisture content may optionally be included in the mass flow rate determination.

The DMFR may be obtained for various positions of the swath shield. In an up swath shield position, the DMFR may be obtained from the equations:

$$DMFR=26.85-(2.38E-2*SSF)-(1.82E-2*CRS) \qquad (13)$$

where SSF is the measured swath shield force and CRS is the conditioner roller speed.

In an intermediate swath shield position, the DMFR may be obtained from the equation:

$$DMFR=21.26-(1.14E-2*SSF)-(2.46E-2*CRS) \qquad (14)$$

In a down swath shield position, the DMFR may be obtained from the equation:

$$DMFR=8.30-(1.22E-2*SSF) \qquad (15)$$

Experimental evidence indicated that for the down swath shield position the CRS was not needed, but may be needed in other designs or machines.

Figure 10:
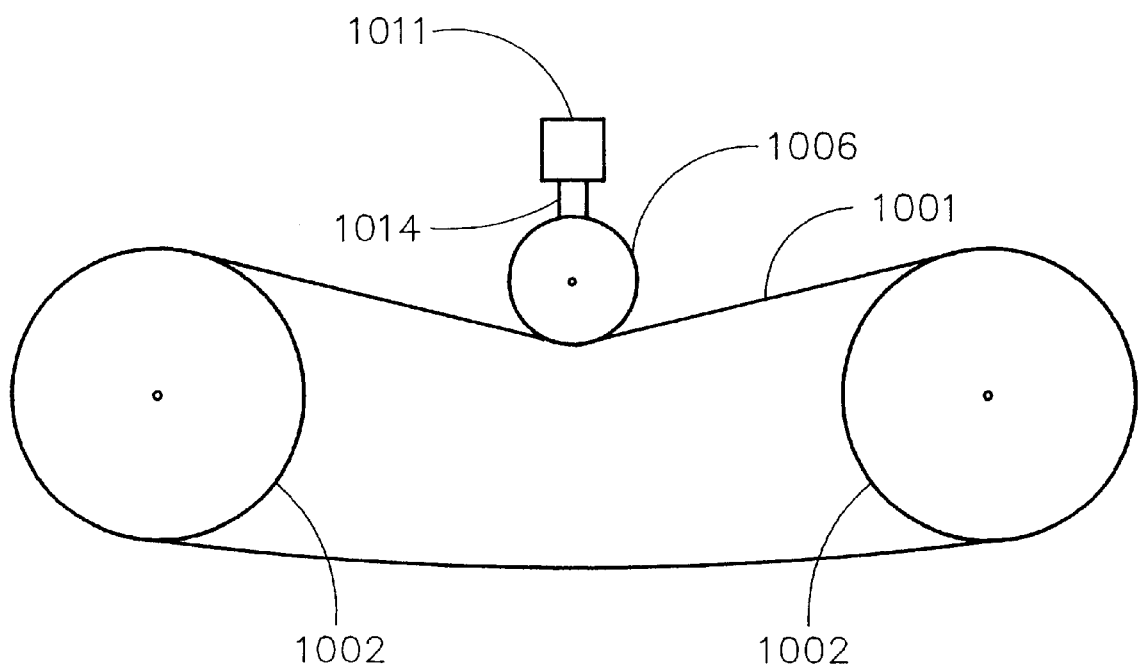
FIG. 10 shows a yield monitor according to the present invention for a typical belt drive arrangement used in a forage processing machinery.

FIG. 10 shows a yield monitor according to the present invention for a typical belt drive arrangement used in a forage processing machinery. The belt drive includes a belt 1001, at least two pulleys 1002, and at least one idler pulley 1006 used to maintain tension on the belt 1001. A belt drive may be used, for example, to drive the impeller in a mower conditioner, to drive the conditioner rollers in a mower conditioner, etc. The load on the impeller, and thus the load on the belt 1001, will be affected by crop mass-flow rate.

The idler pulley 1006 may be directly supported (such as through an adjustable linkage or bracket 1014), or may be biased to provide a tensioning force (in order to maintain a belt tension). A biasing device 1014 may be, for example, a spring or a hydraulic cylinder that urges the idler pulley 1006 against the belt 1001. Under a heavy load, the idler pulley 1006 may provide an increasing force in opposition to the biasing device or bracket 1014.

The opposition force on the idler pulley 1006 may be determined by supporting the idler with a force measuring device 1011, such as, for example, a load cell. The force measuring device 1011 may be placed in series with a support or with a biasing device 1014. Alternatively, the loading on the idler pulley 1006 may be measured by monitoring a hydraulic cylinder pressure in a hydraulic cylinder biasing device, such as by using a strain gauge pressure transducer. Belt load may therefore be related to the mass flow rate.

The belt tension measurement may be applied not only to a mower conditioner, but also to any other type of forage processing machinery that employs a belt drive to process the forage flow, such as, for example, harvesters, windrowers, mowers, balers, etc.

In addition to the force signal on the idler 1006, forage processing machinery intake parameters includes a roller or impeller speed input. The mass flow rate, in conjunction with a groundspeed and a cut or pickup width, may be used to generate a yield amount on a per cell basis. The moisture content, cutting angle, and machine angle may optionally be included in the mass flow rate determination.

Figure 11:
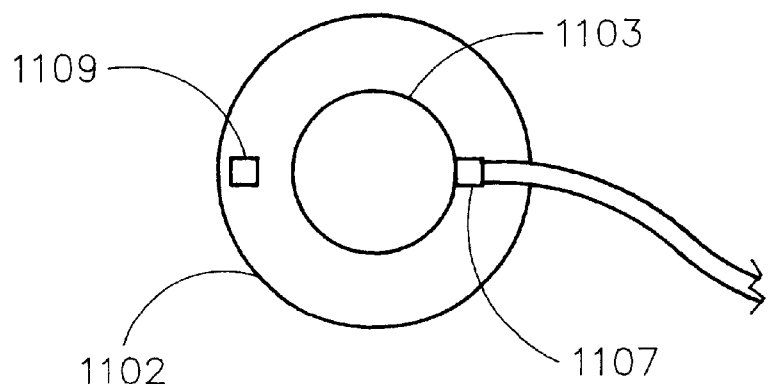
FIG. 11 shows a yield monitor according to the present invention for a hydraulic drive motor of a forage processing machinery.

FIG. 11 shows a yield monitor according to the present invention for a hydraulic drive motor 1103 of a forage processing machinery. The hydraulic drive motor may be coupled to a load device 1102 that is rotated by the hydraulic drive motor 1103. For example, a cutting platform, feed roller, or a conditioner roller may be driven hydraulically. The load on the hydraulic drive motor 1103 powering such a load device may be used to determine a mass flow rate.

The load on the hydraulic drive motor 1103 may be determined by measuring the inlet hydraulic fluid pressure in conjunction with the rotational speed of the load device 1102. Measuring the inlet hydraulic fluid pressure may be accomplished, for example, through the use of a strain gauge pressure transducer 1107 located at the inlet. Measuring the rotational speed may be accomplished by detecting a magnet 1109 attached to the load device 1102, for example. A magnetic detector, such as a Hall Effect device, may be used to measure rotations of the load device 1102. Alternatively, other rotational speed detectors may be used, such as optical detectors, etc. The rotational speed may be a measurement of either the speed of the hydraulic drive motor 1103 or may be a measurement of a rotational speed of the load device 1102 being rotated by the hydraulic drive motor 1103.

The hydraulic drive measurement may be applied not only to a mower cutting platform, but also to any other device of a mower conditioner or to any type of forage processing machinery that employs a hydraulic drive to process the forage flow, such as, for example, harvesters, windrowers, mowers, balers, etc.

In addition to the pressure signal for the hydraulic drive motor 1103, forage processing machinery intake parameters includes a roller/impeller speed input. The mass flow rate, in conjunction with a groundspeed and a cut or pickup width, may be used to generate a yield amount on a per cell basis. The moisture content, cutting angle, and machine angle may optionally be included in the mass flow rate determination.

Volume

In a second general category of forage yield monitors, a volume measurement is used to determine a mass flow rate. The volume measurement is typically performed on a forage stream that is entering or flowing through forage processing machinery. Assuming a constant forage stream width, such as the width of a belt or conveyor moving the forage stream or the cross-sectional area of a spout or chute, a measure of the forage stream depth provides a volume measurement. This forage stream depth or thickness measurement can be performed either continuously or periodically. By using a plurality of volume measurements along with a forage stream speed (i.e., a blower speed, for example), the yield monitor can obtain an accurate mass flow rate.

Figure 12:
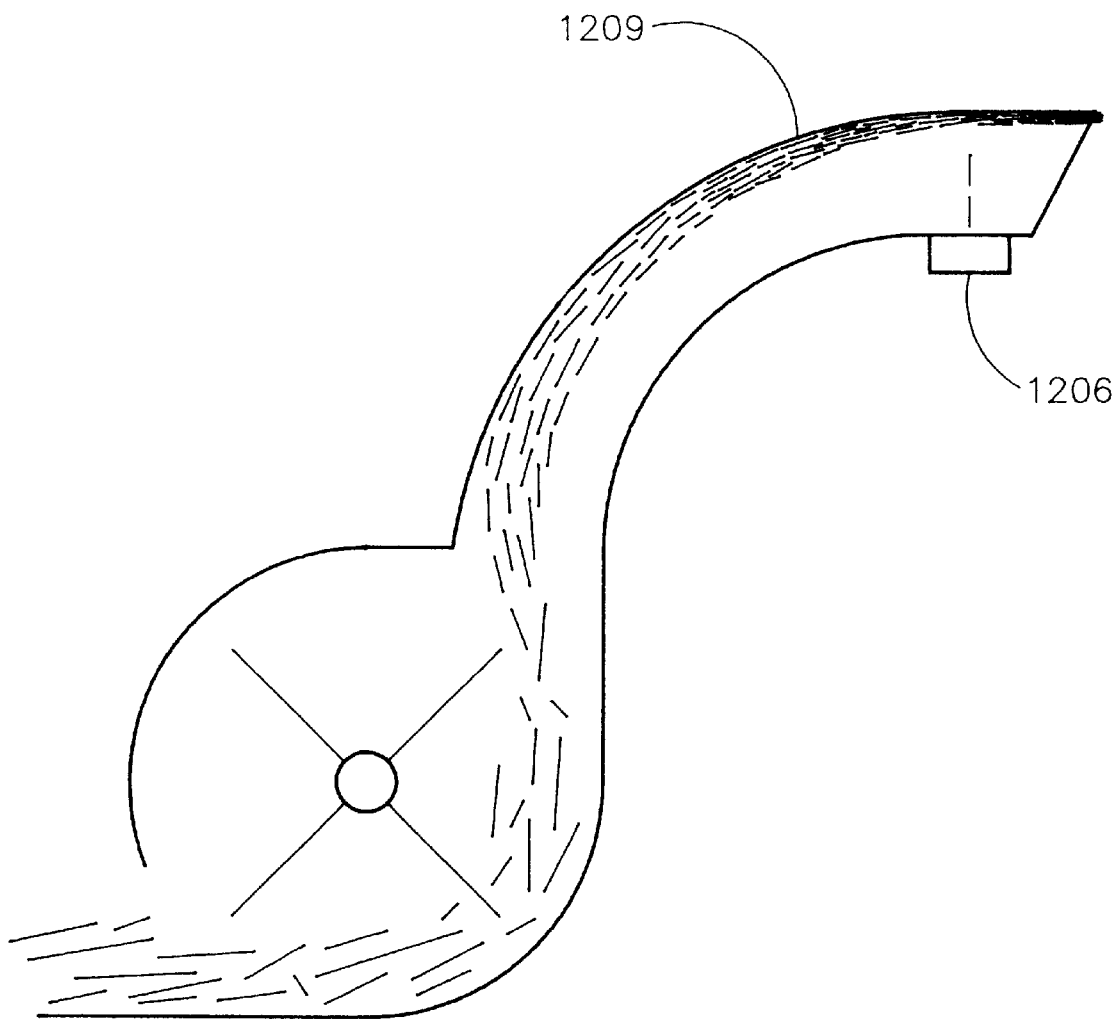
FIG. 12 shows a yield monitor according to the present invention including a flow depth measurement in a forage processing machinery having a spout.

FIG. 12 shows a yield monitor according to the present invention including a flow distance measurement in a forage processing machinery having a spout 1209. The spout 1209 is generally movable in order to direct the discharged forage stream, and curves from a substantially vertical portion to a roughly horizontal portion. A flow stream distance sensor 1206, such as an ultrasonic transducer 1206, measures a forage stream distance, with the distance measurement being substantially related to a mass flow rate.

The ultrasonic transducer 1206 may be any type of commercially available ultrasonic transducer that generates an output signal that is related to distance. The distance measurement is accomplished by measuring a time period between an ultrasonic sound transmission and the receipt of reflected sound waves. This may apply to, for example, a forage processing machinery that incorporates a blower wherein the forage is transported by air through the spout 1209 into some sort of wagon or container. The ultrasonic transducer 1206 does not measure energy absorption or forage density in order to determine the mass flow rate.

Due to the speed of the forage stream, typically about 55 meters per second at the blower, the forage flows along the top of the spout 1209 after the spout 1209 curves from substantially vertical to substantially horizontal. In a spout of about eight to ten inches in depth, the forage stream flow depth may range up to about four inches. Therefore, by knowing the spout depth and the distance to the forage stream, the forage stream depth may be determined.

In addition to the distance measurement from the ultrasonic sensor 1206, forage processing machinery intake parameters includes a blower speed and spout position inputs. The mass flow rate, in conjunction with a groundspeed and a cut or pickup width, may be used to generate a yield amount on a per cell basis. The moisture content, length of cut, and cutterhead position may optionally be included in the mass flow rate determination.

As previously discussed, the moisture measurement may be performed on-the-go in the forage processing machinery, or may be independently measured, such as, for example, a hand measurement, and entered into the accumulated yield amount results.

In addition, the yield monitor may correlate a volume measurement with a forage processing machinery groundspeed, a forage processing cut width, a conveyor belt width, a blower speed, etc., (where applicable).

Accumulation

In accordance with another aspect of the invention, the forage yield is determined by measuring forage volume increments as they are accumulated. This measurement technique is applicable to forage processing machinery such as balers and especially to square balers, and may also be employed in round balers or in other forage processing machinery. By measuring forage volume increments as they are accumulated, the forage processing machinery can reliably determine a forage yield amount.

Figure 13:
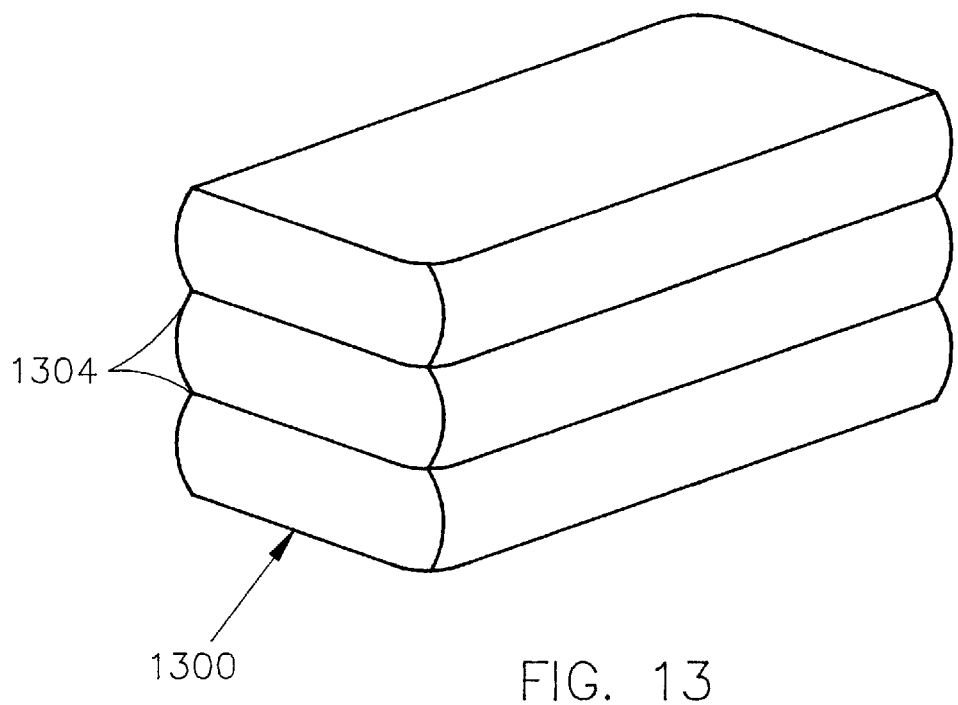
FIG. 13 shows a typical square bale.

FIG. 13 shows a typical square bale 1300. The bale 1300 is formed of compressed forage, and is held together by one or more loops of twine or wire 1304, or alternatively by a net wrap.

In a square baler, the forage is lifted from the ground using a tine pickup and fed into a pre-compression chamber by crank operated feeder forks. From the pre-compression chamber, additional feeder forks move the volume of forage upward into a main compression chamber. Once the forage is fed into the main compression chamber, a plunger 1509 (see FIG. 15) advances and compresses the forage charge against previously compressed forage held in the bale chamber. The plunger 1509 therefore adds quantities of forage to the forming bale with each stroke. These compressed quantities are referred to as slices or flakes, and a bale is formed of a plurality of flakes.

Configurations of pre-compression chambers vary between manufacturers, with some types cycling the feeder forks every time the main compression plunger advances (generating flakes of varying thickness), while on other types the feeder forks do not engage until the pre-compression chamber is full (generating flakes of an essentially constant thickness). These two baler types may use different accumulation measuring methods, discussed below.

Figure 14:
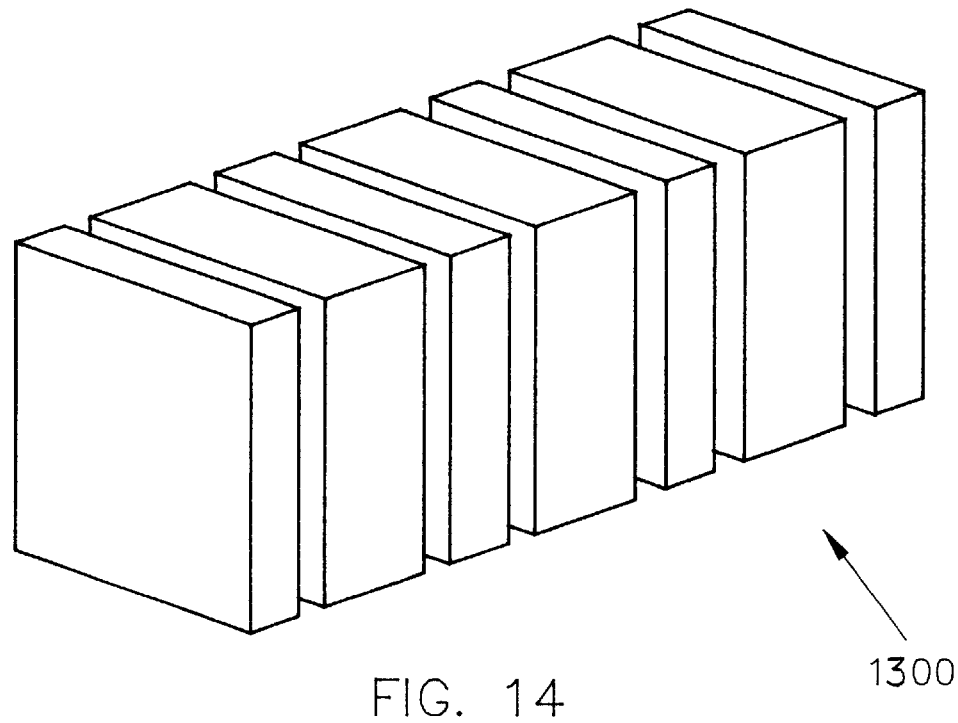
FIG. 14 shows a bale formed of individual flakes.

FIG. 14 shows a bale 1300 formed of individual flakes according to the first pre-compression chamber type having a fixed compression cycle time. The figure shows how individual flakes may vary in thickness due to variations in yield as the forage is picked up and baled. In areas of thin forage, a compression stroke will add a slice or flake of compressed forage that is thinner than a flake added in a high-yield area.

Compression of forage occurs in the bale chamber because the sides of the bale chamber converge to provide resistance to movement of the forming bale. Resistance to movement through the chamber is also a function of crop moisture and a crop friction coefficient. The forage is held in a compacted position in the bale chamber as the plunger 1509 returns to the home position after the compression stroke. Once the forage in the bale chamber has reached the desired length, the bale formation is terminated and the bale is tied up and discharged. In areas of higher yield, the end of the forming bale will move through the baler at a faster rate. The rate at which the bale advances through the bale chamber is therefore related to the yield of forage being harvested.

Balers may be equipped with force sensors that measure the force on the compression chamber sidewalls. This force is directly related to the density of the bale being formed, and the force sensor(s) therefore provides a bale density measurement. The baler manufacturer may provide a calibration data that may be used to receive the chamber sidewall force signal as a common force unit.

Forage moisture content may be obtained by sensors installed in the bale chamber, and may measure moisture content through the use of commonly available moisture measuring devices that employ capacitance, resistance, near infra-red reflectance, or other moisture measurement principles.

The bale density and moisture measurements may be used in conjunction with the volume increment accumulation measurements to provide a yield amount.

Figure 15:
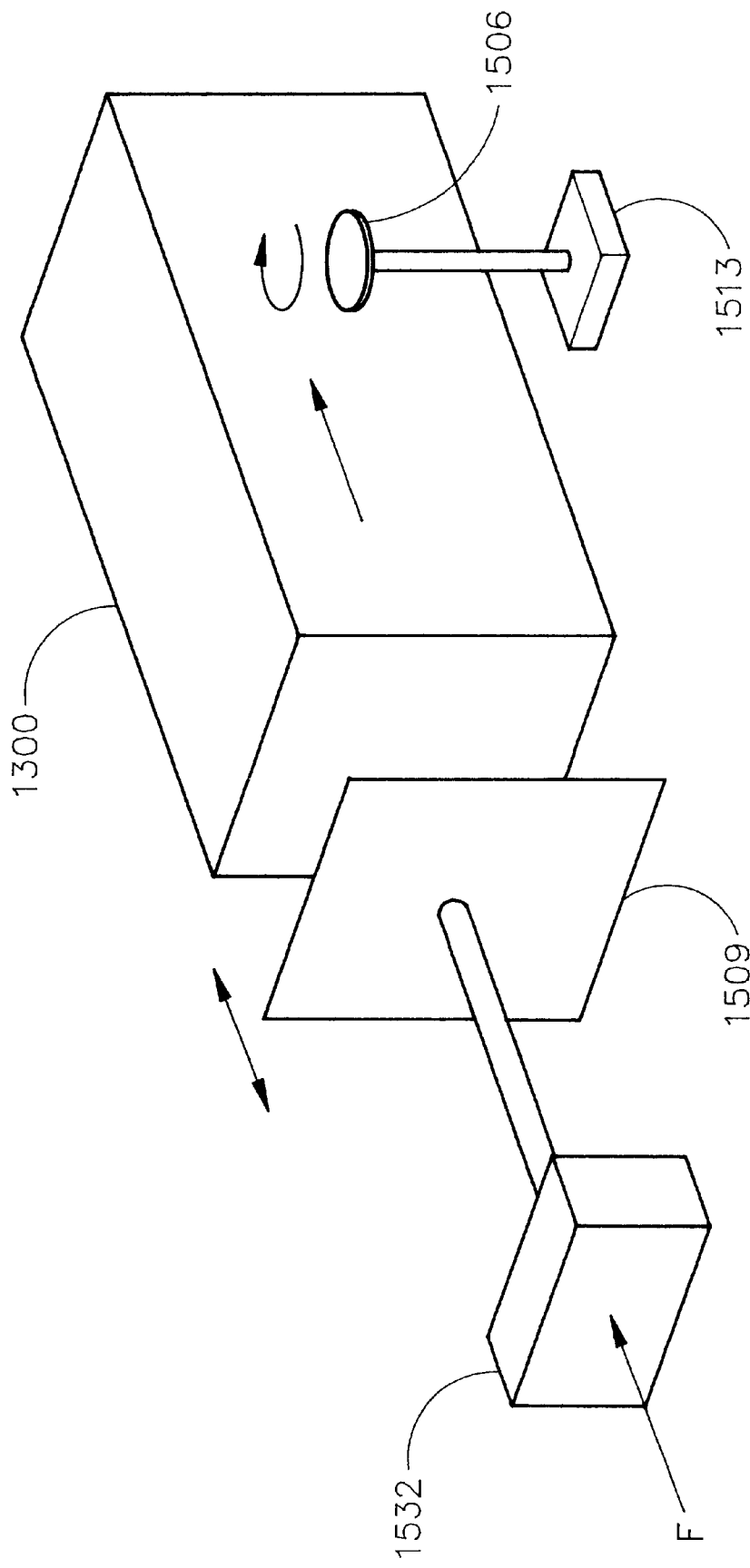
FIG. 15 shows a volume increment accumulation measurement yield monitor embodiment that employs a measuring wheel in contact with the forming bale.

FIG. 15 shows a volume increment accumulation measurement yield monitor embodiment that employs a measuring wheel 1506 in contact with the forming bale 1300. The measuring wheel 1506 is connected to a sensor 1513 that measures the rotation of the measuring wheel 1506. The measuring wheel 1506 rotates as the forming bale 1300 moves inside the baler. The rate of bale movement for each volume increment, combined with the bale density, is substantially related to the crop mass flow rate.

Preferably, the measuring wheel is a star wheel, with the points of the star wheel engaging with and partially penetrating into an outer region of the forming bale 1300. The points of the star wheel therefore ensure that the star wheel does not slip with respect to the forming bale 1300. Alternatively, the measuring wheel 1506 may have points, ridges, or other projections that engage the forming bale 1300, or may be smooth but pressed against the forming bale 1300 with a force adequate to prevent slippage.

The displacement of the measuring wheel 1506 is substantially equal to the rate of movement of the bale through the chamber. The rate at which the measuring wheel 1506 rotates may be measured using commercially available sensors such as rotary encoders, optical wheels having notches that create light pulses, proximity sensors such as embedded magnets and detectors, etc.

As a safeguard against a backlash movement of the measuring wheel 1506, the sensor 1513 may be capable of detecting the rotational direction of the measuring wheel 1506. For example, a commercially available quadrature encoder may be capable of detecting both a displacement and a displacement direction.

The rate of bale movement for-each forage volume increment, combined with bale density and moisture content, is substantially related to the crop mass flow rate. Therefore, the accumulation measurement yield monitor may generate a yield amount from the bale movement measurement and the density measurement.

In addition to the displacement signal for the measuring wheel 1506, forage processing machinery intake parameters includes bale cross-section and bale chamber density/pressure inputs. The mass flow rate, in conjunction with a groundspeed and a cut or pickup width, may be used to generate a yield amount on a per cell basis. The moisture content, the plunger force or pressure, and the weight of the bale at the discharge chute may optionally be included in the mass flow rate determination.

The volumetric flow rate (VFR) for alfalfa may be determined through use of the equation:

$$VFR=0.11+(9.60E-3*SWEC)-(2.62E-3*PCS) \quad (16)$$

Where SWEC is the star wheel encoder count in pulse counts (i.e., a displacement measurement) and PCS is the plunger crank speed in strokes per minute.

The wet mass flow rate for alfalfa may be determined through use of the equation:

$$WMFR=30.36+(0.21*SWEC)-(0.70*PCS) \quad (17)$$

The dry mass flow rate for alfalfa may be determined through use of the equation:

$$DMFR=(0.19*SWEC)-(0.13*PCS) \quad (18)$$

The volumetric flow rate for wheat straw may be determined through use of the equation:

$$VFR=(1.09E-3*SWEC)-(0.70E-3*PCS) \quad (19)$$

The wet mass flow rate for wheat straw may be determined through use of the equation:

$$WMFR=13.53+(0.12*SWEC)-(0.31*PCS) \quad (20)$$

The dry mass flow rate for wheat straw may be determined through use of the equation:

$$DMFR=13.45+(0.11*SWEC)-(0.30*PCS) \quad (21)$$

FIG. 15 also shows a second accumulation measurement yield monitor embodiment having a force sensor 1532 on the plunger 1509. The plunger 1509 may be driven by a crank or other device. The force sensor 1532 provides a force measurement, and may be, for example, a linear force transducer. Alternatively, the force sensor 1532 may be a torque sensor positioned on a crank (not shown) driving the plunger 1509. In another alternate embodiment, the force signal may be generated by a hydraulic pressure transducer in a baler where the plunger 1509 is hydraulically driven, such as, for example, by a hydraulic cylinder. The force sensor 1532 provides a force signal that may be used in different ways to generate a yield amount, as discussed below in connection with FIG. 16.

Figure 16:
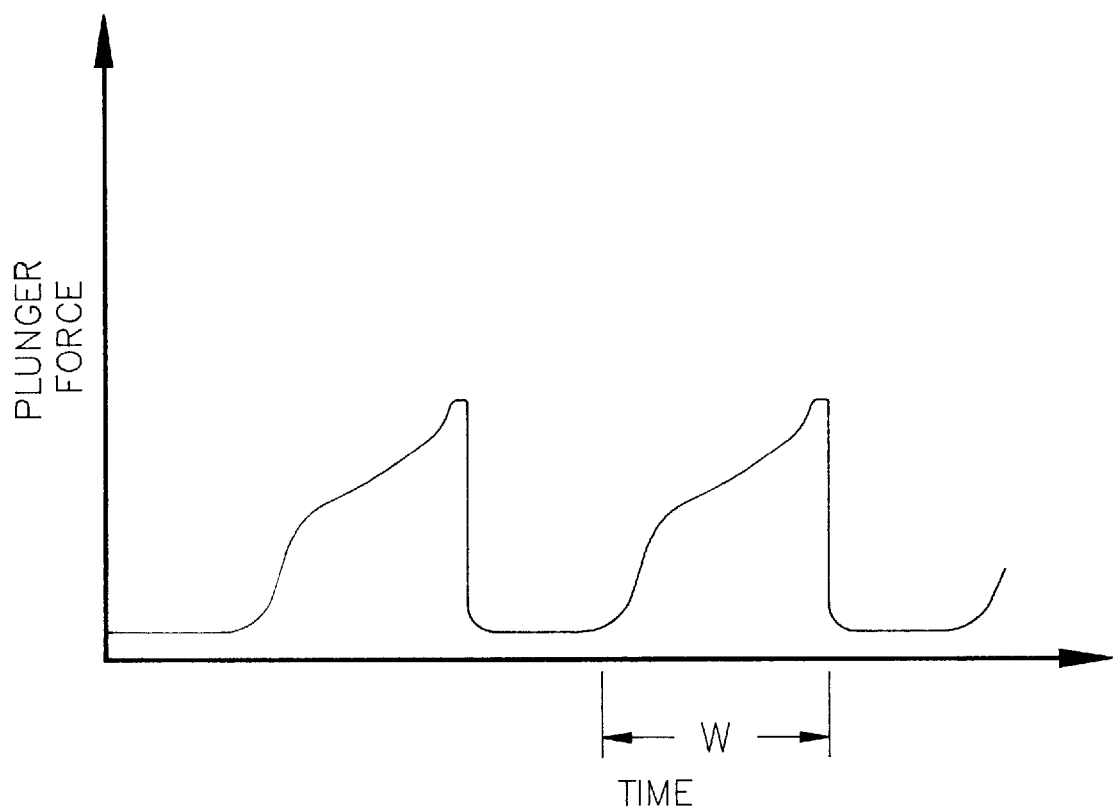
FIG. 16 is a graph of a typical compression force signal generated during compression of a bale flake.

FIG. 16 is a graph of a typical compression force signal generated during compression of a bale flake. The signal may have a pulse width W and an amplitude (vertical axis). The amplitude may vary based on a forage charge volume, forage type, forage moisture content, etc.

In a first force measurement embodiment, the yield monitor measures an average plunger force. The average plunger force is substantially related to the volume of forage being compressed. The average plunger force may be obtained by averaging or integrating a pulse amplitude, and multiple pulse amplitudes may be summed.

In addition to the force signal, forage processing machinery intake parameters includes bale cross-section and bale chamber density/pressure inputs. The mass flow rate, in conjunction with a groundspeed and a cut or pickup width, may be used to generate a yield amount on a per cell basis. The moisture content, the measuring wheel displacement, and the weight of the bale on the baler discharge chute may optionally be included in the mass flow rate determination.

The volumetric flow rate for alfalfa may be determined through the use of the equation:

$$VFR=0.36+(0.45*NAPSO)-(7.17E-3*PCS) \quad (22)$$

where NAPSO is the net average plunger sensor output and PCS is the plunger crank speed. NAPSO may be determined from a plurality of plunger force measurements $a_1, a_2, \ldots a_n$, as determined through the use of the equation:

$$NAPSO=[\text{mean}(a_1, \ldots a_n)-10^{th}\text{percentile}(a_1, \ldots a_n)]/\text{Time} \quad (23)$$

The wet mass flow rate for alfalfa may be determined through the use of the equation:

$$WMFR=84.33+(116*NAPSO)-(1.52*PCS) \quad (24)$$

and the dry mass flow rate through the use of the equation:

$$DMFR=66.89+(90.67*NAPSO)-(1.16*PCS) \quad (25)$$

In a second force measurement embodiment, the yield monitor measures a force pulse width W to generate a yield amount. A larger volume forage charge takes longer to compress (the compression lasts until the compression force exceeds a predetermined threshold). Therefore, the pulse width W is substantially related to compression time, and therefore is substantially related to yield.

In addition to the force signal, forage processing machinery intake parameters includes bale cross-section and bale chamber density/pressure inputs. The mass flow rate, in conjunction with a groundspeed and a cut or pickup width, may be used to generate a yield amount on a per cell basis. The moisture content, the measuring wheel displacement, and the weight of the bale on the baler discharge chute may optionally be included in the mass flow rate determination.

The volumetric flow rate (VFR) for alfalfa may be determined through the use of the equation:

$$VFR=(0.30*PW)-(1.15E-3*PCS) \quad (26)$$

where PW is the measured pulse width and PCS is the plunger crank speed.

The wet mass flow rate for alfalfa may be determined through the use of the equation:

$$WMFR=(69.16*PW)-(0.27*PCS) \quad (27)$$

The dry mass flow rate for alfalfa may be determined through the use of the equation:

$$DMFR=(53.73*PW)-(0.21*PCS) \quad (28)$$

The volumetric flow rate for wheat straw may be determined through the use of the equation:

$$VFR=0.32+(0.21*PW)-(6.66E-3*PCS) \quad (29)$$

where PW is the measured pulse width and PCS is the plunger crank speed.

The wet mass flow rate for wheat straw may be determined through the use of the equation:

$$WMFR=38.06+(26.63*PW)-(0.78*PCS) \quad (30)$$

The dry mass flow rate for wheat straw may be determined through the use of the equation:

$$DMFR=36.76+(25.20*PW)-(0.77*PCS) \quad (31)$$

The above equations were derived for plunger force measurements that were sampled at 130 Hz and stored at 6

Hz. The accuracy is improved when the sampling rate is increased. The set of equations below were created for measurements having a fast sampling rate of 160 Hz and a 85 Hz storage rate.

The volumetric flow rate for wheat straw at a fast sampling rate may be determined through the use of the equation:

$$VFR=(0.58*PW)-(1.34E-3*PCS) \quad (32)$$

The wet mass flow rate for wheat straw at a fast sampling rate may be determined through the use of the equation:

$$WMFR=(74.52*PW)-(0.18*PCS) \quad (33)$$

The dry mass flow rate for wheat straw at a fast sampling rate may be determined through the use of the equation:

$$DMFR=(70.75*PW)-(0.17*PCS) \quad (34)$$

A yield monitor using the plunger force pulse width may also receive and use information such as a forage type, a moisture content, a bale density, etc., to derive a yield measurement.

Yield Monitor Hardware

The various signals discussed above may be input into a computer that generates the yield amount. The computer may be any type of general purpose computer. This may include portable personal computers such as a notebook or laptop computer, palm-held computers, personal digital assistants (PDAs), etc. Alternatively, the computer may be a dedicated computer such as a micro-controller, integrated into an application specific yield monitor and manufactured in a casing suitable for field applications. In addition, the yield monitor may be integrated into a machine monitor built into a forage processing machinery or into a tractor. Such a device is typically located at an operator station.

The yield monitor must be connected to one or more sensors located on the particular forage processing machinery, and must be capable of receiving inputs such as force inputs, displacement inputs, distance inputs. This may be done in conjunction with other inputs, such as a forage processing machinery groundspeed.

The yield monitor preferably includes memory for storing input data and for storing any other needed data, such as tables, etc. The memory may therefore contain data for calibrating, conditioning or improving the yield amount generated by the yield monitor. Such data may include, for example, moisture tables correlating percent forage moisture to forage mass, forage type tables correlating a forage type to an average or expected mass, groundspeed tables for calculating yield per cell, tables of field or cell boundaries, forage processing stream width (may vary by machine and/or manufacturer), tables of an average forage processing stream volume for a forage stream depth, tables correlating force values to a forage mass flow, etc. In addition, the yield monitor may be able to accept GPS (global positioning system) data for the purpose of recording forage yield on a cell-by-cell basis, or may incorporate a GPS receiver.

It should be understood that although the various embodiments may be independently used as a yield monitor, the various sensors do not have to be mutually exclusive. Therefore, a yield monitor may include multiple force measurements, for example, to determine a mass flow rate.

Forage Processing Machinery Groundspeed Control

Forage harvesting equipment is getting larger and more sophisticated. Often the operator of the machinery is not the owner and may lack training or familiarity with the machine. If the operator is unsure of the harvesting rate, then the maximum harvesting rate can be exceeded and plugging of the machine can occur. This can waste harvesting time and may even cause damage to the machine. Likewise, if the operator is overly concerned about exceeding the maximum or optimum harvesting rate, then the operator may run the machine too slowly and stretch out the harvesting time.

One solution is to employ a yield monitor according to one of the aspects of the present invention. A forage yield monitor may provide instantaneous and continuous visual yield feedback to the operator, and may allow the machinery operator to maintain a machine ground speed that is substantially optimum, minimizing harvesting or processing time while avoiding plugging and/or excessive wear and tear on the machine.

FIG. 17 is a flowchart 1700 of a visual yield feedback process aspect of the present invention. In step 1703, the yield monitor determines a mass flow rate in a forage processing machinery.

In step 1705, the yield monitor receives a ground speed value from the forage processing machinery.

In step 1708, the yield monitor calculates a yield amount.

In step 1713, the yield monitor displays the yield amount. In this manner, the yield monitor provides a visual yield feedback that the operator may use to control the groundspeed of the forage processing machinery. In addition, the yield monitor may optionally display a suggested optimum groundspeed based on the yield amount.

In addition to providing feedback to the operator, the forage yield monitor according to one of the aspects of the present invention may be used to directly control a machinery groundspeed. Because modern farm machinery is becoming increasingly automated and controlled by computers, the yield monitor may be able to provide a speed input to a machinery control computer that would allow the machine to automatically control the ground speed of the machine according to an instantaneous yield rate. Therefore, in regions of heavy forage yield, the machinery would be able to slow down and maintain an optimum ground speed, or speed up in regions of lower yield. This could be accomplished while the yield monitor (or other onboard computer) is logging the yield values for future recall and use, including forming yield maps of the harvested field.

FIG. 18 is a flowchart 1800 of an automatic groundspeed control signal generation process aspect of the present invention. In step 1803, the yield monitor determines a mass flow rate in a forage processing machinery.

In step 1808, the yield monitor receives a groundspeed value from the forage processing machinery.

In step 1812, the yield monitor calculates a yield amount.

In step 1818, the yield monitor generates a groundspeed control signal.

In step 1824, the groundspeed control signal may be fed to a forage processing machinery powertrain or engine control computer that may use the signal to regulate and change the groundspeed. In this manner, the yield monitor provides a groundspeed control signal that may be used to automatically and optimally control the groundspeed independent of the operator.

The yield monitor may contain a first computer that performs steps 1803 through 1818, and step 1824 may be performed by a second computer such as a powertrain control computer. Alternatively, all of the steps could be performed by one computer, such as the powertrain control computer. The forage processing machinery computer could incorporate a yield monitor in its software that receives a mass flow rate signal and processes the mass flow rate signal to control the groundspeed. This may be done in, for example, self-propelled forage harvesters, self-propelled balers, etc.

In addition to groundspeed control, the yield monitor according to any aspect of the present invention may also be used to control other forage processing machinery operating parameters. For example, in a roller type mower conditioner, the yield amount may be used to control the roller gap clearance, the roller separation force (a force needed to move the rollers apart), or the roller speed. In an impeller type mower conditioner, the hood clearance and impeller speed could be varied. Other mower conditioner parameters that could be controlled are, for example, a reel speed and a position of windrow forming shields (affecting windrow width).

In a forage harvester, the yield amount may be used to optimize chopping and to minimize plugging or overloading. For example, the yield amount may be used to control a cutter head speed, a cutter bar clearance, a blower speed, etc. In a forage harvester that includes processing rollers that crack grain kernels in the harvested forage (such as corn kernels, for example), the yield amount may be used to determine a roller gap clearance, a roller speed, etc.

The forage yield amount may also be used to determine service requirements of a forage processing machinery, such as when to sharpen a cutter blade or a shearbar, when to lubricate components, when to adjust tolerances such as a knife-to-shearbar clearance, etc.

Furthermore, the forage yield amount may be used to control additives, such as silage inoculants or other spray-on or added treatments.

Yield Management

The yield of a forage crop at the time of harvest can be valuable management data for several reasons. If a custom harvester does the harvesting, the yield data can serve as a basis for charging the crop owner.

Forage is a livestock feed and having a measure of the quantity of feed harvested is important in determining the number of animal units that can be supported by that feed.

Forage quality is often related to how quickly the forage is removed from the field after it reaches a desired harvesting condition (i.e., the forage may degrade due to disease, moisture, pests, etc., in the field). The ability to cut or harvest forage at an optimum speed may allow the forage to be more quickly removed from a field.

Many forage crops, such as alfalfa and grasses, are perennial plants. Forage yield maps could be used to determine when the crop must be re-established because of declining production, or could also be used to evaluate new forage varieties.

Forage crops are often grown in rotation with high input row crops and knowing forage yield during those rotations away from row crops would maintain a field output database. Although inputs (i.e., fertilizer, etc.) to forage crops are often low, with corn silage being an exception, geographically referenced forage yield could be an important input to geographical information systems. A geographically referenced forage yield could therefore be used to control inputs to a particular field, including determining on a per cell basis the application levels of fertilizer, pesticides, herbicides, seed counts, etc.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A yield monitor for a forage processing machinery, comprising:
    an impeller hood extending over an impeller, said hood being hinged to said forage processing machinery and communicating a forage stream impingement force to an associated at least one force measuring device, with said at least one force measuring device generating a force signal substantially related to a forage mass flow rate;
    a computer that receives said force signal and generates a yield amount based upon said force signal, a forage processing machinery groundspeed, an impeller speed, and forage processing machinery intake parameters.

2. The yield monitor of claim 1, wherein said forage processing machinery intake parameters comprise a cut width; and a hood position.

3. The yield monitor of claim 1 wherein said force measuring device generates a substantially instantaneous force signal and said computer generates a substantially instantaneous mass flow rate.

4. The yield monitor of claim 1, wherein said force measuring device comprises a pressure transducer.

5. The yield monitor of claim 1, wherein said force measuring device comprises a load cell.

6. The yield monitor of claim 1, wherein said force measuring device comprises a strain gauge.

7. The yield monitor of claim 1, wherein said yield monitor generates a groundspeed control signal from said yield amount, with said groundspeed control signal capable of being used by said forage processing machinery to control a forage processing machinery groundspeed.

* * * * *